United States Patent
Luomi et al.

(10) Patent No.: US 11,399,256 B2
(45) Date of Patent: Jul. 26, 2022

(54) STORAGE SIZE BASED OFFLOADING OF GEOFENCE PROCESSING

(71) Applicant: HERE Global B.V., Eindhoven (NL)

(72) Inventors: Marko Luomi, Tampere (FI); Lauri Aarne Johannes Wirola, Tampere (FI); Petri Rauhala, Tampere (FI); Mika Viitala, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/870,641

(22) Filed: May 8, 2020

(65) Prior Publication Data
US 2020/0359162 A1    Nov. 12, 2020

(30) Foreign Application Priority Data
May 10, 2019  (EP) .................................... 19173740

(51) Int. Cl.
*H04W 4/029* (2018.01)
*H04W 4/021* (2018.01)
*H04L 67/568* (2022.01)

(52) U.S. Cl.
CPC ......... *H04W 4/021* (2013.01); *H04L 67/2842* (2013.01); *H04W 4/029* (2018.02)

(58) Field of Classification Search
CPC ....... H04W 4/021; H04W 4/029; H04W 4/02; H04L 67/2842; G01C 21/32; G01C 21/3407; G06F 12/0866; G06F 12/08
See application file for complete search history.

(56) References Cited

U.S. PATENT DOCUMENTS

| | | |
|---|---|---|
| 9,736,636 B1 | 8/2017 | DeLuca et al. |
| 2013/0326137 A1 | 12/2013 | Bilange et al. |
| 2019/0037343 A1* | 1/2019 | Parab ..................... H04W 4/021 |
| 2019/0098448 A1 | 3/2019 | Jain et al. |
| 2021/0058735 A1* | 2/2021 | Wirola ................... H04W 4/022 |
| 2021/0127225 A1* | 4/2021 | Viitala ................... G01S 5/0252 |

FOREIGN PATENT DOCUMENTS

| | | |
|---|---|---|
| EP | 2 744 234 A1 | 6/2014 |
| EP | 3 131 316 B1 | 12/2017 |

OTHER PUBLICATIONS

Extended European Search Report for Application No. EP 19173740.2 dated Oct. 4, 2019, 10 pages.
Besik, L. et al., *Systems and Methods of Managing Geofences*, Technical Disclosure Commons, Defensive Publications Services (Apr. 22, 2016) 10 pages.

* cited by examiner

*Primary Examiner* — Chuong A Ngo
(74) *Attorney, Agent, or Firm* — Alston & Bird LLP

(57) ABSTRACT

A method and apparatus are provided for deciding, for at least one set of geofence related data related to a respective geofence, based at least in part on a storage size of the at least one set of geofence related data, whether or not the at least one set of geofence related data shall be provided to a mobile device to which the respective geofence shall apply. The method and apparatus also provide or cause provision of the at least one set of geofence related data to the mobile device, if it is decided that the at least one set of geofence related data shall be provided to the mobile device.

20 Claims, 8 Drawing Sheets

STORAGE SIZE BASED OFFLOADING OF GEOFENCE PROCESSING

CROSS-REFERENCE TO RELATED APPLICATION

This application claims priority to European Application No. 19173740.2, filed May 10, 2019, the entire contents of which are incorporated herein by reference.

FIELD OF THE DISCLOSURE

The invention relates to the field of geofences, and more specifically to a method of determining whether or not to provide geofence related data to a mobile device based at least in part on a storage size of said geofence related data.

BACKGROUND

Geofences enable defining boundaries of respective geographical areas of interest. Such areas may include a school area, an area defined by a user's home, an area within a factory or within a construction site. When a geofence is applied to a mobile device, an event (e.g. an alert such as a visible notification or a sound at the mobile device) may be triggered when the mobile device passes or traverses a boundary defined by the geofence when entering or exiting a corresponding area of interest.

To trigger the event, the mobile device may monitor (e.g. periodically or repeatedly or continuously estimate) its position relative to the geofence, e.g. by evaluating Global Navigation Satellite System (GNSS), Wireless Local Area Network (WLAN), or Bluetooth signals, or cellular telephone signals based on geographical map data and/or radio map data. In addition or alternatively, the mobile device position may be monitored or tracked relative to the geofence by one or more apparatuses such as servers (exemplarily referred to herein as "tracking cloud"). To this end, the mobile device may (e.g. periodically or repeatedly or continuously) provide position estimates or results of signal measurements (e.g. signal strength or quality) of WLAN or Bluetooth signals, or cellular telephone signals to the tracking cloud to be further evaluated based on geographical map data and/or radio map data. In other words, a geofence applied to a mobile device may be evaluated, i.e. the position of the mobile device may be monitored relative to the geofence to assess if the device is within the geofence boundaries, at the side of the mobile device or at the side of the tracking cloud.

While evaluating the geofence at the side of the tracking cloud may be advantageous in terms of mobile device processing requirements, maintaining required connections to the tracking cloud may lead to a reduced battery lifetime at the mobile device. At the same time, e.g. in case of pluralities of mobile devices and geofences, cloud resources may undesirably be consumed. Moreover, while monitoring the mobile device position relative to the geofence at the mobile device may be advantageous as e.g. positioning technologies to be employed may be chosen to optimize battery consumption, the approach often goes along with higher CPU and storage requirements at the mobile device.

SUMMARY OF SOME EMBODIMENTS OF THE INVENTION

It is inter-alia an object of the present invention to improve geofencing technologies to reduce battery consumption at the mobile device while improving usage of cloud resources.

According to a first exemplary aspect of the invention, a method performed by at least one apparatus is disclosed, said method comprising:
  deciding, for at least one set of geofence related data related to a respective geofence, based on a storage size of the at least one set of geofence related data, whether or not the at least one set of geofence related data shall be provided to a mobile device to which the respective geofence shall apply; and
  providing or causing of providing the at least one set of geofence related data to the mobile device, if it is decided that the at least one set of geofence related data shall be provided to the mobile device.

According to a second exemplary aspect of the invention, a method performed at a mobile device is disclosed, said method comprising:
  providing or causing of providing information indicative of a capacity for storing geofence related data at the mobile device to at least one apparatus,
    the at least one apparatus being configured for deciding, for at least one set of geofence related data related to a respective geofence, based on a storage size of the at least one set of geofence related data, whether or not the at least one set of geofence related data shall be provided to the mobile device;
  obtaining the at least one set of geofence related data related to the respective geofence from said at least one apparatus.

For each of the methods according to the first and second aspects of the invention, an apparatus is further more disclosed (and subsequently referred to as apparatus according to the first or second aspect of the invention) that is configured to perform and/or control the respective method or comprises respective means for performing and/or controlling the steps of the respective method. In this case, it is possible either for all the steps of the respective method to be controlled, or for all the steps of the respective method to be performed, or for one or more steps to be controlled and one or more steps to be performed. One or more of the means can also be performed and/or controlled by the same unit. By way of example, one or more of the means may be formed by one or more processors.

For each of the methods according to the first and second aspects of the invention, an apparatus is furthermore disclosed (and subsequently referred to as apparatus according to the first or second aspect of the invention) that comprises at least one processor and at least one memory that contains program code, wherein the memory and the program code are configured to use the at least one processor to cause an apparatus (for example the apparatus having the processor and the memory) to perform and/or control at least the respective method. In this case, it is possible either for all the steps of the respective method to be controlled, or for all the steps of the respective method to be performed, or for one or more steps to be controlled and one or more steps to be performed.

The apparatus according to the first aspect of the invention may correspond to at least one server and/or to a server cloud (referred to herein as tracking cloud), for example. The at least one server and/or the server cloud may be integrated in the back end of a geofence and/or positioning service providing company, for example. The apparatus according to the second aspect of the invention may be a mobile device, e.g. an Internet-of-Things (IoT) device, a smart home device, a smartphone, a tablet computer, a notebook computer, a smart watch, and a smart band.

For each of the methods according to the first and second aspects of the invention, a system is furthermore disclosed (and subsequently referred to a system according to the first or second aspect of the invention) that comprises one or more apparatuses that are configured to perform and/or control the respective method or have means for performing and/or controlling the steps of the respective method. In this case, it is possible either for all the steps of the respective method to be controlled, or for all the steps of the respective method to be performed, or for one or more steps to be controlled and one or more steps to be performed.

Further, a system is disclosed that comprises at least one apparatus according to the first aspect of the invention and an apparatus according to the second aspect of the invention.

In other words, a system is disclosed that may comprise:
at least one apparatus (e.g. one or more servers, in particular a server cloud) configured for:
deciding, for at least one set of geofence related data related to a respective geofence, based at least in part on a storage size of the at least one set of geofence related data and a capacity for storing geofence related data at a mobile device to which the respective geofence shall apply, whether or not the at least one set of geofence related data shall be provided to the mobile device; and
providing or causing of providing the at least one set of geofence related data to the mobile device, if it is decided that the at least one set of geofence related data shall be provided to the mobile device; and
the mobile device configured for:
providing or causing of providing information indicative of the capacity for storing geofence related data at the mobile device to the at least one apparatus,
the at least one apparatus being configured for deciding, for at least one set of geofence related data related to a respective geofence, based at least in part on the storage size of the at least one set of geofence related data and the capacity for storing geofence related data at the mobile device, whether or not the at least one set of geofence related data shall be provided to the mobile device;
obtaining the at least one set of geofence related data related to the respective geofence from said at least one apparatus.

For each of the methods according to the first and second aspects of the invention, a computer program is furthermore disclosed (and subsequently referred to as computer program according to the first or second aspect of the invention) that comprises program instructions that cause a processor to perform and/or control the respective method when the computer program runs on the processor. In this specification, a processor is intended to be understood to mean control units, microprocessors, microcontrol units such as microcontrollers, digital signal processors (DSP), application-specific integrated circuits (ASICs) or field programmable gate arrays (FPGAs), inter alia.

In this case, it is possible either for all the steps of the respective method to be controlled, or for all the steps of the respective method to be performed, or for one or more steps to be controlled and one or more steps to be performed. By way of example, the computer program may be distributable via a network such as the internet, a telephone or mobile radio network and/or a local area network, for example. The computer program may at least in part be software and/or firmware of a processor. It may equally be implemented at least in part as hardware. By way of example, the computer program may be stored on a computer-readable storage medium, e.g. a magnetic, electric, electromagnetic, optical and/or other kind of storage medium. By way of example, the storage medium may be part of the processor, for example a (nonvolatile or volatile) program memory of the processor or a part thereof. By way of example, the storage medium is substantive, that is to say tangible, and/or non-transitory.

Exemplary embodiments of all aspects of the present invention have some or all of the properties described below.

In accordance with exemplary embodiments of the invention, a geofence corresponds to or defines a boundary of an area of interest in relation to or based on map data. Thereby, in accordance with exemplary embodiments of all aspects of the present invention, one or more geofences may be represented by geofence related data, whereby a respective set of geofence data relates to a respective geofence. A set of geofence related data may include one or more geofence data units. In exemplary embodiments of all aspects of the present invention, a set of geofence related data includes at least geofence definition data and geofence map data, the geofence definition data and the geofence map data respectively being related to the respective geofence.

The geofence definition data is data adapted to define said one or more geofences in relation to or based on a geographical map and/or a radio map represented by the geofence map data. For example, the geofence definition data may correspond to or include data (e.g. coordinate data) representative of one or more geofence boundaries and may e.g. be representative of corners of a polygonal boundary, of center point and radius of a circular boundary, of parameters defining an elliptical boundary, and combinations thereof. The geofence definition data may similarly represent an irregular geofence boundary. To this end, the geofence definition data may include or correspond to coordinate data representing a collection of coordinate points defining such irregular boundary as two-dimensional line in relation to or based on said geofence map data.

Thus, in exemplary embodiments of all aspects of the present invention, the geofence definition data corresponds to or includes coordinate data defining one or more geofence boundaries of a respective geofence and/or data representative of parameters defining one or more geofence boundaries of a respective geofence.

Geofence map data may correspond in particular to data enabling a mobile device to perform geofencing (to monitor its position relative to a corresponding geofence) e.g. in addition to the mentioned geofence definition data for defining a corresponding geofence. For example, geofence map data may correspond to one or more radio maps (or one or more radio models) that can be used for positioning a mobile device for example by passively observing signals broadcasted by nearby radio nodes such as for example WLAN access points, cellular base stations, Bluetooth access points and/or nodes broadcasting assistance data for a Global Naviagtion Satellite System (GNSS). Geofence map data may further include data enabling an action of the mobile device when a geofence transition occurs (e.g. when a mobile device passes a boundary defined by the respective geofence). In accordance with exemplary embodiments of all aspects of the present invention, the geofence map data corresponds to map data enabling estimation of a location of a mobile device inside and/or within immediate surroundings (inside or outside) of at least one geofence boundary. Thereby, in accordance with embodiments of all aspects of the present invention, the geofence map data corresponds to map data in particular enabling determining if a mobile device passes a boundary of at least one geofence, e.g. when entering or leaving an area of interest defined by said at least one boundary.

For example, the geofence map data may include data representative of at least part of a map such as a geographical map and/or a radio map. In accordance with exemplary embodiments of all aspects of the invention, the geofence map data may comprise at least data representative of map tiles including respective portions of at least one boundary defined by one or more geofences. By including or covering respective portions of said at least one boundary, said map tiles cover at least the immediate surroundings of said boundary and thus enable determining if a mobile device passes said boundary. The geofence map data may further comprise also data representative of map tiles within an inner area inside of map tiles including respective portions of the at least one boundary defined by the one or more geofences. Further including such inner map tiles, the geofence map data further enables locating and tracking of a mobile device inside an area defined by at least one geofence.

In the context of the present disclosure, map data may be understood to include in particular geographical map data and/or radio map data e.g. representative of a geographical map. The map data may include for example map data suitable to be used with navigation databases, e.g. the map data defined in line with the Navigation Data Standard (NDS). However, map data is not to be understood to be limited to a specific format and may correspond to any form of data suitable to represent a geographical map. Hereby, for example radio map data may represent a geographical map. Radio map data may correspond to a collection of results of measurements of radio signals (e.g. signal strength or quality measurements) transmitted from access points in combination with location data of respective measurement positions and of respective access points. Access points may include e.g. base stations of one or more mobile communication systems, Wireless Local Area Network (WLAN) access points, Bluetooth (e.g. Bluetooth Low Energy, BLE) access points, etc. Such radio map may thus enable a mobile device to estimate its position by measuring e.g. signal strength of radio signals received from one or more access points and by comparing the measurement result(s) to the radio map. Positions of said one or more access points on the radio map may be identifiable by the mobile device e.g. via access point identification information included in the measured radio signals and may enable relating the measurement results to a radio map. Instead of estimating its position itself, the mobile device may transmit measurement result(s) (and optionally access point identification information) to one or more apparatuses (the at least one apparatus, e.g. one or more servers, e.g. the tracking cloud) which may estimate the position of the mobile device by relating the received measurement data to radio map data stored at the one or more apparatuses.

As disclosed above, evaluating a geofence may in exemplary embodiments of all aspects of the present invention be understood to mean assessing if a mobile device is within a boundary defined by the geofence. To this end, exemplary embodiments of all aspects of the present invention, a position estimate of the mobile device may be monitored relative to the boundary defined by the geofence.

A geofence applied to a mobile device may be evaluated at the side of the mobile device and/or at the side of one or more apparatuses (e.g. one or more servers, e.g. the tracking cloud). As mentioned, evaluating a geofence (assessing, if the mobile device is within the geofence boundaries) at the side of the one or more apparatuses (e.g. the tracking cloud) may be advantageous in terms of processing requirements of a mobile device. At the same time, required network connections of mobile device and the one or more apparatuses (e.g. the tracking cloud) for monitoring may undesirably consume battery at the mobile device.

In order to evaluate one or more geofences at the mobile device, geofence related data (e.g. sets of geofence related data respectively corresponding to the one or more geofences) may be provided to the mobile device to be stored at a corresponding memory. For example, for a geofence applied to a mobile device, geofence definition data including e.g. coordinate data defining geofence boundaries and geofence map data, e.g. radiomap tiles related to the geofence may be stored at the mobile device to be evaluated by the mobile device. This approach may be advantageous as usage of resources may be optimized. For example, used positioning technologies may be adapted to distances between mobile device and geofence boundary. As a result, battery resources of the mobile device may be used in an improved way and battery lifetime may thus be increased. At the same time, server or cloud resources may be saved and events related to passing of the geofence boundary (e.g. an alert at the mobile device) may be triggered with less delay as compared to a case where the geofence is evaluated at one or more apparatuses (e.g. at the tracking cloud). However, as mentioned, requirements in terms of processing resources (e.g. CPU for positioning) and storage resources (for offline storing of radiomaps and/or radio map tiles) at the mobile device are higher. Such requirements become in particular more critical when multiple geofences have to be evaluated (e.g. thousands or even tens of thousands of geofences) per mobile device.

In accordance with various aspects of the present invention, size of geofence related data is a criterion for deciding whether or not to provide geofence related data to a mobile device, e.g. to be stored and/or evaluated at the mobile device. In particular, a size of one or more sets of geofence related data respectively relating to one or more geofences may provide a criterion for deciding whether or not to provide geofence related data relating to one or more geofences to a mobile device to which said one or more geofences shall apply. Thus, deciding, for at least one set of geofence related data (e.g. geofence definition data and/or geofence map data) related to a respective geofence, based on a storage size of the at least one set of geofence related data, whether or not the at least one set of geofence related data shall be provided to a mobile device to which the respective geofence shall apply may be understood to mean deciding whether or not to provide geofence related data to a mobile device to be stored/evaluated at the mobile device based on a (combined) size of one or more sets of geofence related data respectively relating to one or more respective geofences.

In accordance with aspects of the present invention, said deciding is performed at the at least one apparatus, which may correspond to one or more servers and/or to said tracking cloud. In exemplary embodiments, the at least one apparatus corresponds to one or more (entity) entities different from the mobile device. It is to be noted that in the context of the present disclosure, any step or sub-step of a method in accordance with the first aspect of the present invention may be performed by one apparatus or by one or more apparatuses of the at least one apparatus. In other words, for example, steps performed when deciding whether or not to provide the geofence related data to the mobile device may be performed by one apparatus (e.g. one server of said tracking cloud) or may be distributed among apparatuses (e.g. servers of said tracking cloud).

In exemplary embodiments of the invention, a method performed by said one or more apparatuses may include obtaining an indication (e.g. respective geofence definition data) of one or more geofences that are to be applied to a mobile device. Such indication may be obtained for example at the one or more apparatuses (e.g. the tracking cloud) for example via a user interface (UI) connected to the one or more apparatuses either directly (e.g. being a user interface of a server apparatus) or via a network (e.g. via a local area network and/or the internet) and/or via a service Application Programming Interface (API) of the one or more apparatuses. Said indication may include geofence definition data and/or geofence map data for the respective geofence(s) to be applied to said mobile device.

Said method may in exemplary embodiments further include obtaining information indicative of a storage size of at least part of (e.g. geofence map data and/or geofence definition data) the at least one set of geofence related data. For example, said method may in exemplary embodiments further include obtaining information indicative of a storage size at least of geofence map data related to said respective geofence. Thus, obtaining information indicative of said storage size may e.g. be understood to mean obtaining a storage size of map tiles of a geographical map and/or of a radio map, where a respective map tile may include at least a portion of a boundary defined by a respective one of said one or more geofences. The information indicative of a size of the geofence map data may be available at (and obtained from) the one or more apparatuses (e.g. one or more servers corresponding to the tracking cloud) and/or at one or more further apparatuses (e.g. further one or more servers), exemplarily referred to herein as positioning cloud.

If more than one representation of the at least one set of geofence related data related to the respective geofence is available (at the at least one apparatus, e.g. at the tracking cloud, and/or at the at least one further apparatus, e.g. at the positioning cloud), the obtaining information indicative of a storage size of at least part of the at least one set of geofence related data may be understood to mean obtaining the information based on the representation having the smallest storage size among the representations of the at least one set of geofence related data related to the respective geofence. For example, if the at least one further server holds available more than one representation of the at least one set of geofence related data related to the respective geofence, the information based on the representation having the smallest storage size among the representations of the at least one set of geofence related data related to the respective geofence held available at the at least one further server may be obtained. In exemplary embodiments, the one or more apparatuses (e.g. the tracking cloud) may be configured to request transmission of—in case available—smallest sizes of geofence map data (e.g. respective radiomap sizes) from said at least one further apparatus (e.g. from at least one further server, e.g. from the positioning cloud).

Further, in exemplary embodiments, if, for example based on the obtained information indicative of a storage size of at least part of the at least one set of geofence related data or based on an obtained at least one set of geofence related data, the storage size of the at least one set of geofence related data is considered too large for the at least one set of geofence related data to be stored on the mobile device (e.g. based on a capacity of the mobile device for storing geofence related data), and if more than one representation of the at least one set of geofence related data related to the respective geofence is available, information is obtained indicative of a storage size of at least part of the at least one set of geofence related data based on a representation having a smaller storage size among the representations of the at least one set of geofence related data related to the respective geofence.

In other words, if for example the at least one apparatus determines a storage size of said at least one set of geofence related data to be too large for the geofence related data to be stored at the mobile device, e.g. based on obtained information on said storage size or based on an obtained set of geofence related data, information may be obtained on a representation of said at least one set of geofence related data having a smaller and/or the smallest storage size among available representations, e.g. held available at the at least one further server. As above, also in such case, in exemplary embodiments, the one or more apparatuses (e.g. the tracking cloud) may be configured to request transmission of—in case available—a smaller size and/or a smallest size of geofence related data such as geofence map data (e.g. respective radiomap sizes) from said at least one further apparatus (e.g. from at least one further server, e.g. from the positioning cloud).

In exemplary embodiments of the invention, deciding whether or not the at least one set of geofence related data shall be provided to the mobile device is further based on a capacity for storing geofence related data at the mobile device. In exemplary embodiments of any aspect of the present invention, said capacity for storing geofence related data at the mobile device corresponds to a current (present, actual, remaining) capacity for storing geofence related data at the mobile device. For example, said capacity may correspond to a capacity of a corresponding memory or of part of a corresponding memory of the mobile device for storing geofence related data. The capacity may for example correspond to a full capacity of such memory if no geofence related data is yet stored at the mobile device and/or may correspond to a remaining capacity of such memory if geofence related data related to one or more geofences is already stored at said memory.

In particular the full capacity of such memory without stored geofence related data may for example correspond to a predetermined value, e.g. a preset (e.g. a factory preset) storage capacity of a corresponding memory and/or may be adjustable by a user e.g. via a user interface of the mobile device. In particular a current capacity may be reported to the one or more apparatuses from the mobile device, e.g. upon request. For example, the one or more apparatuses (e.g. the one or more servers corresponding to the tracking cloud) may request transmission of said information from the mobile device to the one or more apparatuses. To this end, the one or more apparatuses may in exemplary embodiments transmit a corresponding request to the mobile device, which in turn may transmit information indicative of the (current) capacity to the one or more apparatuses in response to such request.

In accordance with exemplary embodiments, the deciding whether or not to provide the at least one set of geofence related data to the mobile device may include suitable processing based on the storage size of the at least one set of geofence related data. In exemplary embodiments, when deciding whether or not to provide a set of geofence related data related to a respective geofence to the mobile device, the one or more apparatuses may be configured to compare a storage size of said set (e.g. geofence map data and/or geofence definition data included in said set) to a storage size threshold, which in exemplary embodiments corresponds to said capacity of the mobile device to store geofence related data. Likewise, in case of more than one set of geofence related data, the at least one apparatus may in exemplary embodiments be configured to compare a storage size of said more than one (at least two) sets of geofence related data to said storage size threshold. Thereby, comparing said storage size of the at least two sets of geofence related data to said storage size threshold is to be understood as comparing a value representative of a combined (or total) storage size of the at least two sets of geofence related data to said storage size threshold. For example, the one or more apparatuses may be configured to compare a sum of respective storage sizes (or a different value representative of a total storage size) of the at least two sets of geofence related data to said storage size threshold. In other words, in case of more than one set of geofence related data (e.g. indicated to the one or more apparatuses via the user interface and/or the service API), the method may in exemplary embodiments of the first aspect of the present invention include comparing a storage size of at least two sets of geofence related data to a storage size threshold, and deciding that the at least two sets of geofence related data shall be provided to the mobile device if the storage size is below or equal to the storage size threshold.

Based thereon, the method may in an exemplary embodiment of the invention further include deciding that the at least two sets of geofence related data (e.g. all sets of geofence related data the combined size of which is compared to the storage size threshold) shall not be provided to the mobile device if the storage size of the at least two sets of geofence related data (the combined storage size of all of said sets) is larger than the storage size threshold. In this exemplary embodiment, the method may for example further comprise assessing or causing of assessing if the mobile device is within a boundary defined by the respective geofence (at the at least one apparatus). In other words, in such exemplary embodiment, if the combined size of the associated data exceeds the storage size threshold (e.g. the capacity of the mobile device to store geofence related data), none of the geofences would be stored at the mobile device. In such case, corresponding geofencing (monitoring of the mobile device position in relation to one or more geofences corresponding to said data) may be applied (only) at the one or more apparatuses (at the server side, at the tracking cloud).

Alternatively or in addition, in an exemplary embodiment, it may be decided that one or more geofences are not applied to a mobile device if a size of corresponding geofence related data exceeds the storage size threshold (e.g. the capacity of the mobile device to store geofence related data). In other words, geofencing based on said one or more geofences would neither be performed by the mobile device nor at the at least one apparatus (the tracking cloud). Further, if said data exceeds a capacity of all mobile devices currently in communication with the at least one apparatus (the tracking cloud), the data may be discarded, i.e. not further processed by the at least one apparatus (the tracking cloud). In other words, in an exemplary embodiment, the method may further include deciding that at least one of the at least two sets of geofence related data shall be not used in relation to the mobile device and/or shall be discarded if the storage size of the at least two sets of geofence related data is larger than the storage size threshold.

When comparing said storage size of more than one set of geofence related data to said storage size threshold, a method in accordance with exemplary embodiments may aim at increasing a number of geofences to be provided to the mobile device for offline evaluation. To this end, a group of geofences may in exemplary embodiments be sorted (ordered, arranged, organized, put in order) based on a storage size of corresponding sets of geofence related data (geofence map data and/or geofence definition data) before a (total) storage size of the ordered group is determined. Geofences of the group of geofences may sorted/ordered from a geofence relating to a smallest set of geofence related data to a geofence relating to a largest set of geofence related data.

In other words, in exemplary embodiments, comparing the storage size to the storage size threshold may comprise sorting (ordering, arranging, organizing, putting in order) the at least two sets of geofence related data in order of storage size of each respective set e.g. from a set of smallest storage size to a set of largest storage size; and comparing a storage size of the at least two sorted sets of geofence related data (e.g. a sum of respective storage sizes of the at least two sorted sets of geofence related data) to the storage size threshold, e.g. to the capacity of the mobile device for storing geofence related data. In an alternative example, the at least two sets of geofence related data may be sorted in order of storage size of each respective set from a set of largest storage size to a set of smallest storage size In exemplary embodiments, sorting of geofences may in addition or alternatively to the storage size be based on one or more further attributes (e.g. at least one of geofence priority, geographical attributes of a corresponding geofence, distance between mobile device and geofence, etc.).

Such sorting of geofences may enable determining a number of sets of geofence related data that fit into a memory of the mobile device reserved for storing geofence related data.

For example, if a size of sets of geofence related data of an initial group of ordered geofences is equal to or below the storage size threshold, and if adding one or more further set(s) of geofence related data would result in a size of geofence related data of the enlarged group exceeding said storage size threshold, the one or more apparatuses (e.g. the tracking cloud) may be configured to decide to provide geofence related data relating to the geofences (only) of the initial group to the mobile device.

In other words, in exemplary embodiments, for example, if a storage size of a group (e.g. said enlarged group) of sorted sets of geofence related data exceeds the storage size threshold, the at least one apparatus may be configured for determining a sub-group (e.g. said initial group) of the group of sorted sets of geofence related data including a sorted sequence of sets starting from the set of smallest storage size, wherein a storage size of the sub-group is equal to or below the storage size threshold; and for providing or causing of providing the sub-group of sets of geofence related data to the mobile device. Thereby, the at least one apparatus may be configured to determine a storage size of said group of sorted sets of geofence related data to exceed the storage size threshold before determining said sub-group. Alternatively, the at least one apparatus may be configured incrementally determine said sub-group, e.g. may determine per set of geofence related data if said set is to be provided to the mobile device or if providing said sub-group of sets to the mobile device the storage size threshold would be exceeded. In other words, in exemplary embodiments, determining a sub-group of the sorted sets of geofence related data including a sorted sequence of sets starting from the set of smallest storage size may be understood to mean incrementally determining a sub-group of the sorted sets of geofence related data including a sorted sequence of sets starting from the set of smallest storage size by deciding for each set included in the sub-group whether or not providing said sub-group of set(s) to the mobile device exceeds the storage size threshold.

In such case, the one or more apparatuses (e.g. the tracking cloud) may further be configured to decide to evaluate the geofence related to the further set(s) of geofence related data at the one or more apparatuses. In other words, if it is decided, in particular based on a storage size of the at least one set of geofence related data (e.g. based on said enlarged group including the initial group), that the at least one set of geofence related data (e.g. the one or more further set(s) of geofence related data) shall not be provided to the mobile device, the method may comprise, by an entity different from the mobile device such as the at least one apparatus, assessing or causing of assessing if the mobile device is within a boundary defined by the respective geofence.

In other words, exemplarily referring to said initial group and to said enlarged group, in accordance with an exemplary embodiment, for at least one set of geofence related data included in the group of sorted sets (said enlarged group) and not included in the determined sub-group (the initial group), the at least one apparatus is configured for assessing or causing of assessing if the mobile device is within a boundary defined by a respective geofence related to the at least one set of geofence related data included in the group of sorted sets and not included in the determined sub-group (e.g. the one or more further set(s) of geofence related data).

In exemplary embodiments, for geofence related data decided to be provided to the mobile device, the geofence related data may be provided to the mobile device in ordered form. In other words, in accordance with exemplary embodiments of the invention, providing or causing of providing the at least one set of geofence related data to the mobile device may be understood to mean providing or causing of providing one or more sets of geofence related data to the mobile device in order of storage size of respective geofence related data, with a set of geofence related data of smallest storage size being provided first.

The above disclosed processing based on the storage size exemplarily performed upon deciding whether or not to provide the at least one set of geofence related data to the mobile device, in particular when including the above described size-based ordering procedure may help increasing a number of geofences that may be offloaded to be evaluated at the mobile device.

In accordance with the first aspect of the present invention, the at least one set of geofence related data to the mobile device is thus provided to the mobile device. To this end, for example, the one or more apparatuses (e.g. the tracking cloud) may cause (e.g. trigger) transfer of geofence map data relating to geofences for which it is decided that they are to be provided to the mobile device from said further one or more apparatuses (e.g. said positioning cloud) to the mobile device. To this end, the one or more apparatuses (e.g. the tracking cloud) may for example inform the mobile device of the geofences that are to be provided to the mobile device and may to this end e.g. transmit (or cause transmission of) geofence definition data of said geofences to be provided to the mobile device (and optionally identification information of the one or more further apparatuses, e.g. the positioning cloud) to the mobile device. Based thereon, the mobile device may be enabled to download respective geofence map data from the one or more further apparatuses (e.g. from the positioning cloud). In other words, for example, the tracking cloud may trigger the mobile device to download at least geofence map data from the positioning cloud.

The one or more apparatuses (e.g. the tracking cloud) may alternatively or in addition inform the one or more further apparatuses (e.g. the positioning cloud) of the geofences to be provided to the mobile device e.g. by transmitting (or by causing transmission of) geofence definition data of the geofences to be provided to the mobile device (and optionally e.g. identification information of the mobile device) to the one or more further apparatuses (e.g. the positioning cloud) such that the one or more further apparatuses (e.g. the positioning cloud) may be caused to transfer respective geofence map data to the mobile device. Geofence definition data may in this case be transferred from the one or more apparatuses (e.g. the tracking cloud) and/or the one or more further apparatuses (e.g. the positioning cloud) to the mobile device. In other words, for example, the tracking cloud may trigger the positioning cloud to initiate download at least of geofence map data to the mobile device.

Yet alternatively or in addition, the one or more apparatuses (e.g. the tracking cloud) may cause transmission of geofence map data relating to geofences to be provided to the mobile device from the one or more further apparatuses (e.g. the positioning cloud) to the one or more apparatuses (e.g. the tracking cloud), e.g. by transmitting geofence definition data to the one or more further apparatuses (e.g. the positioning cloud). The one or more apparatuses (e.g. the tracking cloud) may transfer geofence map data received from the one or more further apparatuses (e.g. the positioning cloud) to the mobile device e.g. together with corresponding geofence definition data. In other words, for example, the tracking cloud may relay at least the map data from the positioning cloud to the mobile device.

Thus, once at least one set of geofence related data (geofence definition data and/or geofence map data) is defined at the one or more apparatuses (e.g. the tracking cloud) for example via the user interface (UI) or the Application Programming Interface (API), the corresponding data may be transferred to the mobile device by the at least one apparatus (e.g. the tracking cloud) and/or the at least one further apparatus (e.g. the positioning cloud).

In accordance with exemplary embodiments, providing or causing of providing the at least one set of geofence related data to said mobile device may be understood to mean providing or causing of providing the at least one set of geofence related data to said mobile device to enable said mobile device to store and/or evaluate the at least one set of geofence related data. In other words, by receiving the at least one set of geofence related data, the mobile device may be enabled to evaluate (assess if the mobile device is within a boundary defined by a geofence) at least one geofence respectively related to the at least one set of geofence related data at its end. The mobile device may to this end be enabled to monitor (e.g. periodically or repeatedly or continuously estimate) its position in relation to the at least one geofence and may trigger a corresponding event when the mobile device determines that it passes a boundary defined by said at least one geofence (e.g. upon entering or leaving a corresponding area of interest defined by said boundary). An event triggered when it is determined that a mobile device passes a boundary defined by at least one geofence may in exemplary embodiments of all aspects of the invention correspond to an alert such as a sound and/or a visible notification to a user of the mobile device and/or a communication between the mobile device and the at least one apparatus (e.g. the tracking cloud) and/or the at least one further apparatus (e.g. the positioning cloud) and/or at least one further mobile device.

As disclosed above, if e.g. by adding further geofence related data, a total size of geofence related data corresponding to one or more geofences to be applied to a mobile device exceeds a storage size threshold, evaluation of such one or more geofences is not offloaded to the mobile device but performed at the side of the one or more apparatuses (e.g. the tracking cloud). Similarly, if a single geofence to be evaluated relates to geofence related data with a storage size exceeding said storage size threshold, evaluation of said single geofence is not offloaded to the mobile device but performed at the side of the one or more apparatuses.

Thus, in exemplary embodiments of the invention, if it is decided, based on a storage size of the at least one set of geofence related data, that the at least one set of geofence related data shall not be provided to the mobile device, the at least one apparatus may be configured for assessing or causing of assessing if the mobile device is within a boundary defined by the respective geofence and may to this end be configured for estimating a position of the mobile device relative to the respective geofence based at least in part on the geofence map data related to said respective geofence. The at least one apparatus may further be configured for determining if the mobile device has passed a boundary of a geographical area defined by said respective geofence; and if it is determined that the mobile device has passed a boundary of the geographical area, for causing an event, in particular at the mobile device.

Thus, the at least one apparatus (e.g. the tracking cloud), may monitor (e.g. periodically or repeatedly or continuously estimate) the position of the mobile device (e.g. based on results of signal strength measurements of radio signals received at the mobile device, the measurement results being transferred to the at least one apparatus) and may relate said position to a boundary defined by a corresponding geofence stored as corresponding geofence map data at the at least one apparatus (e.g. the tracking cloud) and/or at the at least one further apparatus (e.g. the positioning cloud). If the geofence map data is stored at the at least one further apparatus (e.g. the positioning cloud), the at least one apparatus (e.g. the tracking cloud) may relate the mobile device position to said boundary via communication (e.g. network communication) with the at least one further apparatus (e.g. the positioning cloud). Alternatively, geofence related data, e.g. geofence map data obtained from the at least one further apparatus (e.g. the positioning cloud) may be provided to and stored at the at least one apparatus (e.g. the tracking cloud).

As can be taken from the above, size of geofence related data, in particular size of corresponding geofence map data and/or corresponding geofence definition data, may provide a suitable criterion for deciding whether or not to store geofence related data of one or more geofences at a mobile device to which said one or more geofences shall apply. As a result, a method according to the first aspect of the present invention may help to determine a number of geofences for which geofence related data can be stored to be efficiently evaluated offline (i.e. at the mobile device), thus enabling on the one hand a power efficient offline operation mode at the mobile device, which on the other hand enables power efficient operation of the entire system (including e.g. one or more mobile devices, the tracking cloud and/or the positioning cloud).

As disclosed above, in exemplary embodiments of all aspects of the present invention, a set of geofence related data relating to a respective geofence comprises (at least) geofence map data and geofence definition data, each of the geofence map data and the geofence definition data relating to the respective geofence. The geofence map data may include data relating to at least one representation of at least one geofence. Thereby, different representations of one geofence may differ for example in resolution and corresponding storage size. Geofence definition data may correspond to data adapted to define the geofence as a boundary e.g. of an area of interest in relation to geographical map data and/or radio map data (representative of geographical map data). Geofence definition data may correspond to coordinate data suitable for defining geographical coordinates, e.g. coordinates of corners of a polygonal geofence boundary, center and radius of a circular geofence boundary, parameters of an elliptical geofence boundary, combinations thereof and/or coordinate data suitable for defining an irregular geofence boundary (e.g. a collection of coordinate points defining such irregular boundary as two-dimensional line in relation to said map data).

In accordance with exemplary embodiments of the first aspect of the present invention, a method comprises obtaining information indicative of a storage size of at least part of the at least one set of geofence related data, in particular from at least one server (e.g. at least one positioning server, e.g. the positioning cloud) via a network connection. In exemplary embodiments in accordance with all aspects of the present invention, network connections may include wired and/or wireless connections.

Thereby, a wired connection may correspond to a communication path or link in a wired communication network employing wire-based communication technology and may correspond to a telephone network connection, a cable television connection, an internet connection, a fiber-optic connection or an electromagnetic waveguide connection.

Further, a wireless connection may correspond to a communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A wireless connection may further include a Device-to-Device (D2D) communication path (e.g. involving vehicles, mobile devices, Road Side Units (RSU) or IOT devices).

For example, said information may be obtained at one or more apparatuses, e.g. server(s) e.g. forming or part of the tracking cloud. Further, said information may be obtained from said at least one further apparatus e.g. the positioning server (e.g. corresponding to or part of the positioning cloud) which may be a separate server, server system, cloud server or which may be part of the one or more server(s) forming said tracking cloud. For obtaining said information indicative of a storage size of at least part of the at least one set of geofence related data (e.g. geofence map data), for example, the at least one apparatus (e.g. the tracking cloud) may obtain one or more corresponding information elements or may obtain the least part of the at least one set of geofence related data as corresponding information and may determine the corresponding storage size therefrom.

In accordance with exemplary embodiments of the present invention, if more than one representation of the at least one set of geofence related data related to the respective geofence is available, the at least one apparatus may be configured for obtaining the information based on the representation having the smallest storage size.

As disclosed above, for example geofence map data related to one geofence may be available in form of one or more representations (e.g. in form of different data formats, in form of different quality, including differing types of information), where different representations may differ in terms of storage size. For example, a positioning server (e.g. at least one further apparatus, e.g. corresponding to or part of the positioning cloud) may hold available more than one representation of geofence map data and may, e.g. upon request from the at least one apparatus (e.g. the tracking cloud), inform the at least one apparatus (e.g. the tracking cloud) of availability of said more than one representation. The positioning server may provide information of part of or of all sizes of geofence map data held available or of only the representation of smallest storage size. Obtaining the information based on the representation having the smallest storage size may be advantageous as it may enable providing a larger number of geofences for evaluation to the mobile device and may thus contribute to achieving a more efficient overall processing.

As disclosed above, in exemplary embodiments of the first aspect of the invention, the method may include obtaining the geofence definition data from a user interface and/or via an application programming interface (API), in particular via a network connection.

As disclosed above, in embodiments of all aspects of the present invention, a network connection may include a wired and or a wireless connection. A wired connection may correspond to a communication path or link in a wired communication network employing wire-based communication technology and may correspond to a telephone network connection, a cable television connection, an internet connection, a fiber-optic connection or an electromagnetic waveguide connection. A wireless connection may correspond to a communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A wireless connection may further include a Device-to-Device (D2D) communication path (e.g. involving vehicles, mobile devices, Road Side Units (RSU) or IOT devices).

For example, a user interface may correspond to a user interface of a user device (e.g. a mobile device such as a smart home device, a smartphone, a tablet computer, a notebook computer, a smart watch, or a smart band) connected with the at least one apparatus (said one or more servers, e.g. the tracking cloud) via a network such as a local area network, the internet and/or any of the above disclosed network connections. A user may for example define geofences e.g. using dedicated software running at the user device via said user interface, corresponding geofence definition data being transferred to the at least one apparatus via said network connection. Similarly, such dedicated software running at the user device may be connected to the at least one apparatus via an application programming interface (API) such that corresponding geofence definition data may be transferred to the at least one apparatus via such API.

As disclosed above, in exemplary embodiments of the first aspect of the present invention, deciding whether or not the at least one set of geofence related data shall be provided to the mobile device is further based on a capacity for storing geofence related data at the mobile device. In such embodiments, the method may further comprise obtaining information indicative of the capacity for storing geofence related data from the mobile device.

For example, such information may be transmitted from the mobile device to the at least one apparatus (e.g. the tracking cloud) via a wireless or a wired network connection. As disclosed above, a wired connection may correspond to a communication path or link in a wired communication network employing wire-based communication technology and may correspond to a telephone network connection, a cable television connection, an internet connection, a fiber-optic connection or an electromagnetic waveguide connection. A wireless connection may correspond to a communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A wireless connection may further include a Device-to-Device (D2D) communication path (e.g. involving vehicles, mobile devices, Road Side Units (RSU) or IOT devices).

In accordance with exemplary embodiments of the first aspect of the present invention, the deciding whether or not the at least one set of geofence related data shall be provided to the mobile device is further based on a positioning history of the mobile device. For example, the deciding may further take into account how often a mobile device has been at a certain location (e.g. within a predefined geographical area) and/or how often a mobile device has been at which type of location. In accordance with such exemplary embodiment, a corresponding priority value may be defined. The deciding whether or not to provide the at least one set of geofence related data to the mobile device may in such embodiments be based on a cost value determined based on said priority value ("priority") and based on the storage size of the at least one set of geofence related data ("size"). Said cost value ("cost") may for example be defined as $$cost = priority/10 + size/100.$$

For exemplary geofences A to F (without limitation) corresponding cost values may be as included in the following table.

| Geofence | Priority | Size (kB) | Cost |
| --- | --- | --- | --- |
| A | 5 | 17 | 0.67 |
| B | 7 | 3 | 0.73 |
| C | 1 | 67 | 0.77 |
| D | 2 | 88 | 1.08 |
| E | 7 | 56 | 1.26 |
| F | 7 | 100 | 1.70 |

Thus, in accordance with this embodiment, an order according to which geofences are sorted (as disclosed above) can be influenced by said additional priority value.

As disclosed above, a second exemplary aspect of the invention relates to a method performed at a mobile device. The mobile device may be an Internet-of-Things (IoT)

device, a smart home device, a smartphone, a tablet computer, a notebook computer, a smart watch, and a smart band.

Thereby, providing or causing of providing information indicative of a capacity for storing geofence related data at the mobile device to at least one apparatus may be understood to mean that a mobile device provides (e.g. transmits, sends or transfers) said information to the at least one apparatus, e.g. to at least one server, e.g. to said tracking cloud, and/or that part of a mobile device, e.g. a processing unit thereof causes such providing from the mobile device to said at least one apparatus. As disclosed above, the capacity may correspond to a capacity of memory space at the mobile device for storing said geofence related data. The capacity may correspond to a preset value (of storage space), e.g. to a factory preset and/or may be set or adjusted by a user of the mobile device.

In accordance with said second aspect, the at least one apparatus is configured for deciding, for at least one set of geofence related data related to a respective geofence, based on a storage size of the at least one set of geofence related data, whether or not the at least one set of geofence related data shall be provided to the mobile device. In other words, the at least one apparatus may be configured to perform the method as disclosed above in relation to the first aspect of the present invention. Said at least one apparatus may thus correspond to one or more servers, e.g. to the tracking cloud.

For the mobile device to provide or cause providing said information indicative of a capacity for storing geofence related data at the mobile device to at least one apparatus, the mobile device is in accordance with said second aspect configured for this particular purpose. For example, the mobile device may be and/or may comprise means specifically programmed for providing said information to said at least one apparatus, e.g. is adapted to provide the information in form of data in a dedicated format that can be processed by the at least one apparatus and that is addressed to the at least one apparatus.

The mobile device may transfer said information indicative of its capacity for storing geofence related data to the at least one apparatus spontaneously, or in response to user input, e.g. to trigger reception of corresponding geofence related data. The mobile device may further provide said capacity upon request. In other words, in accordance with exemplary embodiments of the second aspect of the present invention, the method may further include receiving or causing of receiving a request for providing information to at least one apparatus, the information being indicative of the capacity for storing geofence related data at the mobile device.

A mobile device according to the second aspect of the present invention is further configured for and/or comprises means configured for obtaining the at least one set of geofence related data related to the respective geofence from said at least one apparatus.

Obtaining the at least one set of geofence related data related to the respective geofence from said at least one apparatus may enable the mobile device to store said at least one set of geofence related data related to the respective geofence e.g. in a corresponding memory of the mobile device. Based thereon, the mobile device is enabled to e.g. one or more respective geofences, respectively related to the at least one set of geofence related data. The mobile device may thus be enabled to monitor (e.g. periodically or repeatedly or continuously estimate) its position in relation to said one or more respective geofence(s) and to trigger an alert (e.g. a message displayed to a user and/or a sound) when the mobile device determines that it passes or traverses a boundary defined by said one or more geofence(s).

As disclosed above, in accordance with exemplary embodiments of all aspects of the present invention, each set of geofence related data relating to a respective geofence comprises at least geofence definition data and geofence map data, the geofence definition data and the geofence map data respectively being related to the respective geofence. Further, in an exemplary embodiment of the second aspect of the present invention, the method further comprises obtaining, at least in part, the geofence map data and/or the geofence definition data from the at least one apparatus, e.g. from the at least one server, e.g. from the tracking cloud, via a network connection. As disclosed above, the at least one apparatus may obtain geofence map data e.g. from at least one positioning server (e.g. at least one further apparatus, e.g. said positioning cloud) and may transfer said geofence map data and corresponding geofence definition data to the mobile device.

In accordance with an alternative exemplary embodiment of the second aspect of the present invention, the method may comprise obtaining, at least in part, the geofence map data and/or the geofence definition data from at least one positioning server via a network connection. For example, the at least one apparatus, e.g. the at least one server, e.g. the tracking cloud, may for example provide geofence definition data for geofence related data to the mobile device. The mobile device may then obtain (e.g. download) corresponding geofence map data from the at least one positioning server based thereon.

As disclosed above, aspects of the present invention may relate to methods of prioritizing geofences for the evaluation at the side of the mobile device, wherein geofences are provided to the mobile device in order of size of corresponding geofence related data (e.g. smallest first) until the mobile device quota is reached. In accordance with exemplary embodiments, size may correspond to a size of offline radiomap tiles in bytes required to cover the geofence, i.e. not just to a size required to store the geofence (e.g. the geofence definition data), but to the size of data required to locate the mobile device inside of and in the surroundings of the geofence.

A result of a process in accordance with exemplary embodiments is that a maximal number of geofences are stored/evaluated in the mobile device (client-side evaluation) and a minimum amount of geofence processing and storing is left to the cloud-side.

A tracking system may have a great number of geofences. Different geofences require different amount of memory to be stored and transmitted to the client. A system in accordance with aspects of the present invention is enabled to maximize the number of geofences that can be stored to the mobile device. Such system may include the following components:

Mobile device: For example IoT device, e.g. a tracker;
Tracking cloud: service that creates and maintains geofences, as well as syncs them with the clients and triggers geofence actions;
Positioning cloud: network positioning back-end that generates offline radiomaps used by the mobile device.

Hereby, a geofence size may correspond to: the number of bytes the geofence requires when stored to a memory. This may include information required to define a geofence as well as the size of the radiomap data (e.g. Wi-Fi or cellular radio map data) required to locate the mobile device inside and in the surroundings of the geofence.

Geofence prioritization in accordance with various aspects of the present invention may have the following steps:
1. Tracking cloud gets the geofence definitions (either from user interface (UI) or from other system via a service API). Geofence definitions include the geographical dimensions of the geofence;
2. Tracking cloud requests radiomap sizes related to the geofences from the positioning cloud;
3. Tracking cloud sorts the geofences based on the size in bytes (smallest first). The size is the sum of the bytes required to store the geofence definition (e.g. polygon corner points) and the radio map covering the geofence area and its immediate surroundings;
4. Tracking cloud asks from client how much memory it has for geofences;
5. Tracking cloud determines which geofences will fit as off-line geofences into the client
   When selecting geofences starting from the smallest storage consumption, maximum number of geofences can be stored to the tracker;
6. Rest of the geofences are defined as on-line geofences;
7. Tracking cloud uploads the selected off-line geofences into the client.

In a case where offline radiomaps with different resolution are available, tracking cloud could request smaller resolution (coarse) radiomaps from the positioning cloud for selected geofences in order to fit all geofences as off-line geofences to memory.

A method in accordance with the present invention maximizes the amount of geofences that can be stored as offline geofences into the client. This enables power efficient offline operation mode.

It is to be understood that the presentation of the invention in this section is merely by way of examples and non-limiting.

Other features of the invention will become apparent from the following detailed description considered in conjunction with the accompanying figures. It is to be understood, however, that the figures are designed solely for purposes of illustration and not as a definition of the limits of the invention, for which reference should be made to the appended claims. It should be further understood that the figures are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
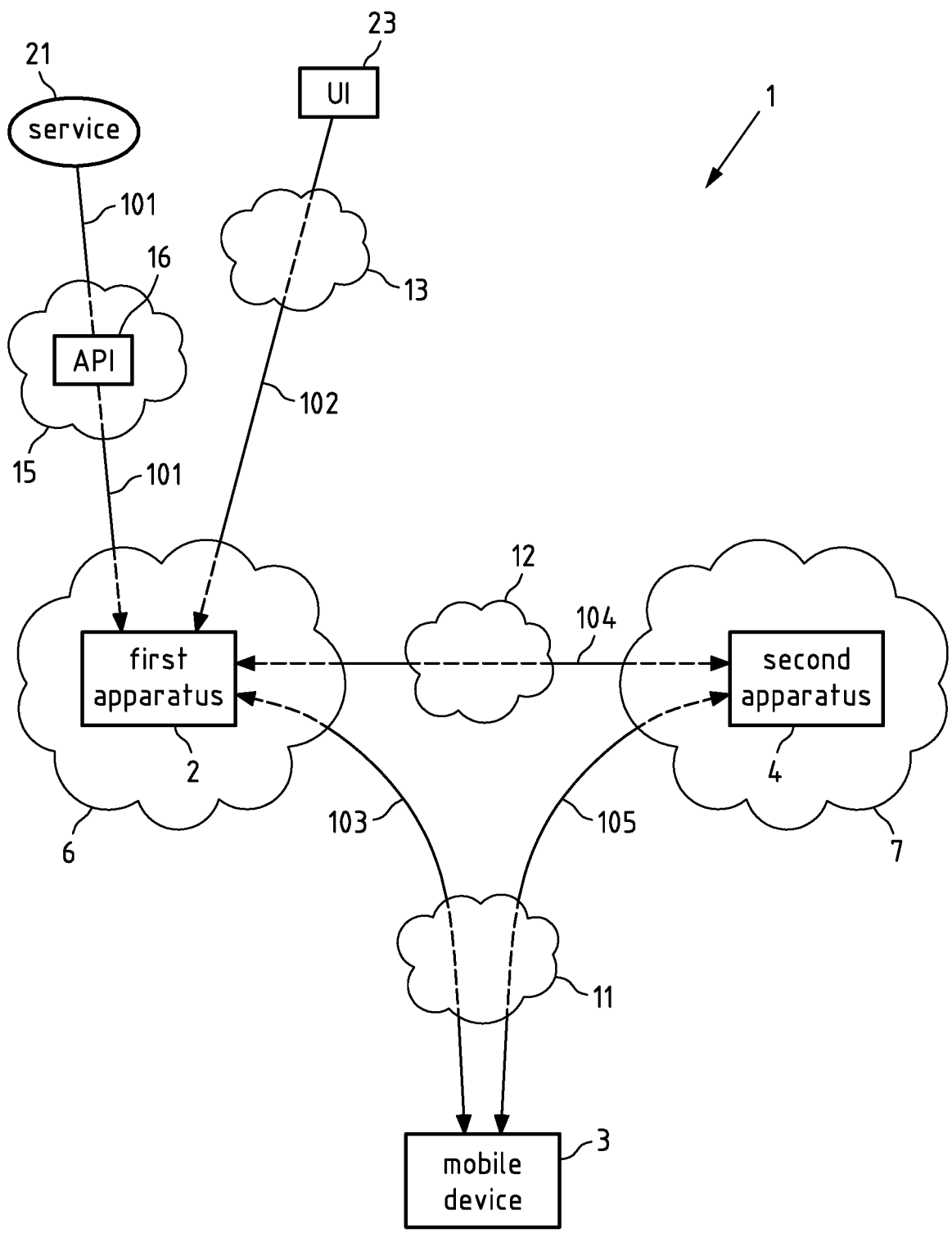
FIG. 1 is a block diagram of an exemplary embodiment of a system according to the invention.

FIG. 1 is a schematic high-level block diagram of a system 1 according to an exemplary aspect of the invention. FIG. 1 shows first apparatus 2 (an example of the at least one apparatus) which may correspond to or include for example one or more servers. Said one or more servers may for example form tracking cloud 6. A user interface (UI) 23 is connected via network path 102 with the first apparatus 2 and/or the tracking cloud 6 via network 13, e.g. a local area network and/or the internet. In an alternative embodiment (not shown) a UI 23 may in addition or alternatively be directly connected with the first apparatus 2, e.g. as display and keyboard directly connected therewith. Service 21 is connected via network path 101 with the first apparatus 2 and/or with the tracking cloud 6 via network 15 and service application programming interface (API) 16. The network 15 may be a local area network and/or the internet and—even though depicted separately from network 13—may correspond to or share portions (network devices and/or connections) with network 13. Service 21 may correspond to a software service implemented at one or more corresponding devices (including e.g. a mobile device and/or a personal computer of a user) which may enable a user to define geofences to be indicated to the first apparatus 2 and/or the tracking cloud 6. Similarly, UI 23 may enable a user to define geofences to be indicated to the first apparatus 2 and/or the tracking cloud 6 e.g. utilizing one or more corresponding software programs part of which or all being hosted by the first apparatus 2 and/or the tracking cloud 6 and/or part of which or all being hosted by an apparatus (not shown) such as a mobile device, a personal computer, etc. connected to the UI 23. Thus, indications of one or more geofences that are to be applied to a mobile device may be provided to the first apparatus 2 and/or to the tracking cloud 6 using UI 23 and/or service 21 one or both of which are connected to the first apparatus 2 and/or the tracking cloud 6 via respective network connections.

FIG. 1 further shows mobile device 3, e.g. an Internet-of-Things (IoT) device, a smart home device, a smartphone, a tablet computer, a notebook computer, a smart watch, and a smart band. Mobile device 3 is connected via network path 103 to the first apparatus 2 and/or the tracking cloud 6 via network 11 which may correspond to a local area network and/or the internet and—even though depicted separately from networks 13, 15—may correspond to or share portions (network devices and/or connections) with networks 13, 15. The mobile device 3 may, for example upon request from the first apparatus 2 and/or the tracking cloud 6, provide information indicative of a capacity for storing geofence related data at the mobile device 3 to the first apparatus 2 and/or the tracking cloud 6 via the shown path 103 between the mobile device 3 and the first apparatus 2 and/or the tracking cloud 6.

As disclosed above, the first apparatus 2 and/or the tracking cloud 6 may be configured to decide, for at least one set of geofence related data related to a respective geofence, based on a storage size of the at least one set of geofence related data, whether or not the at least one set of geofence related data shall be provided to mobile device 3 to which the respective geofence shall apply. For example, the first apparatus 2 and/or the tracking cloud 6 may be configured to obtain, from a second apparatus 4 and/or a positioning cloud 7 shown in FIG. 1 (an example of the at least one positioning server), via network path 104 information indicative of a size of geofence map data related to geofences indicated to the first apparatus 2 and/or the tracking cloud 6 by service 21 and/or via UI 23. The first apparatus 2 and/or the tracking cloud 6 may further be configured to decide, based on one or more geofences that are indicated to the first apparatus 2 and/or the tracking cloud 6 by service 21 and/or via UI 23 whether or not related geofence related data is to be provided to mobile device 3 to be evaluated at the mobile device 3, e.g. based on the capacity for storing geofence related data indicated from mobile device 3 to the first apparatus 2 and/or the tracking cloud 6. The first apparatus 2 and/or the tracking cloud 6 may for example be configured to sort (order, put in order) geofences indicated from service 21 or via UI 23 based on a size of geofence map data for storing and/or evaluating the respective geofences. The first apparatus 2 and/or the tracking cloud 6 may for example be configured to order said geofences starting from the geofence with smallest size of geofence related data to a geofence with largest size of geofence related data. The first apparatus 2 and/or the tracking cloud 6 may be configured to determine one or more geofences the geofence related data of which matches (is below or equal to a threshold defined by) the capacity indicated by mobile device 3 e.g. by adding data sizes of geofence related data corresponding to the ordered geofences until adding geofence related data of a next geofence would exceed said capacity. Geofence related data that matches said capacity may then be stored at the mobile device 3 such that corresponding geofences can be evaluated at the side of the mobile device 3.

To this end, the first apparatus 2 and/or the tracking cloud 6 may be configured to indicate the corresponding geofences to the mobile device 3 e.g. by providing corresponding geofence definition data to the mobile device 3 via network path 103. Based on the geofence definition data, mobile device 3 may be configured to download corresponding geofence map data (e.g. radio map tiles including at least portions of corresponding geofence boundaries) from the second apparatus 4 shown in FIG. 1 (an example of the at least one further apparatus, e.g. the positioning server), which may correspond to or include for example one or more servers. Said one or more servers may for example form positioning cloud 7. Alternatively, the first apparatus 2 and/or the tracking cloud 6 may be configured to obtain such corresponding geofence map data from the second apparatus 4 and/or the positioning cloud 7 and may be configured to transfer said corresponding geofence map data to the mobile device 3 e.g. in combination with the corresponding geofence definition data. Communication such as data transfer between the first apparatus 2 and/or the tracking cloud 6 and the second apparatus 4 and/or the positioning cloud 7 may be performed along network path 104 via network 12, which may correspond to a local area network and/or the internet and—even though depicted separately from networks 11, 13, 15—may correspond to or share portions (network devices and/or connections) with networks 11, 13, 15.

As disclosed above, network connections (path 101 from service 21 to the first apparatus 2 and/or the tracking cloud 6, path 102 from UI 23 to the first apparatus 2 and/or the tracking cloud 6, path 103 from the first apparatus 2 and/or the tracking cloud 6 to the mobile device 3, path 104 from the first apparatus 2 and/or the tracking cloud 6 to the second apparatus 4 and/or the positioning cloud 7 and/or path 105 from the second apparatus 4 and/or the positioning cloud 7 to the mobile device 3) may include wired and/or wireless connections.

Thereby, a wired connection may correspond to a communication path or link in a wired communication network employing wire-based communication technology and may correspond to a telephone network connection, a cable television connection, an internet connection, a fiber-optic connection or an electromagnetic waveguide connection.

A wireless connection may correspond to a communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A wireless connection may further include a Device-to-Device (D2D) communication path (e.g. involving vehicles, mobile devices, Road Side Units (RSU) or IOT devices).

It is to be noted that network connections in accordance with all aspects of the present invention, in particular as disclosed in FIG. 1 (path 101 from service 21 to the first apparatus 2 and/or the tracking cloud 6, path 102 from UI 23 to the first apparatus 2 and/or the tracking cloud 6, path 103 from the first apparatus 2 and/or the tracking cloud 6 to the mobile device 3, path 104 from the first apparatus 2 and/or the tracking cloud 6 to the second apparatus 4 and/or the positioning cloud 7 and/or path 105 from the second apparatus 4 and/or the positioning cloud 7 to the mobile device 3) may correspond to combinations of wired and wireless connections. For example, mobile device 3 may include a transceiver configured for wireless communication and the first apparatus 2 and/or the tracking cloud 6 may include a transceiver configured for wired communication such that network path 103 may include a combination of wireless and wired communication links.

Figure 2:
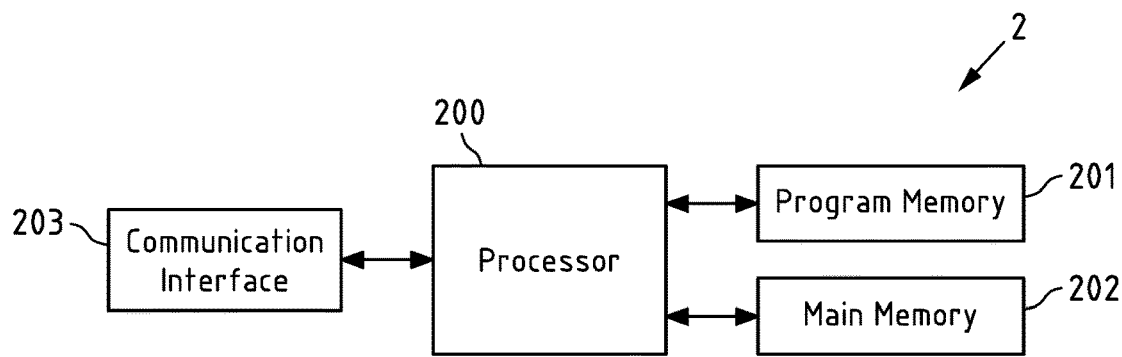
FIG. 2 is a block diagram of an exemplary embodiment of a server (e.g. tracking server) according to the invention.

FIG. 2 is a block diagram of an exemplary embodiment of a first apparatus 2 (an example of the at least one apparatus) according to the invention, which may correspond to or include for example one or more servers. In the following, it is assumed that first apparatus 2 of FIG. 2 corresponds to the first apparatus of FIG. 1.

First apparatus 2 comprises a processor 200. Processor 200 may represent a single processor or two or more processors, which are for instance at least partially coupled, for instance via a bus. Processor 200 executes a computer program code stored in program memory 201 (e.g. computer program code causing first apparatus 2 to perform any one embodiment of the disclosed method in accordance with the first aspect of the present invention (e.g. the steps of any one embodiment of the disclosed method) or a part thereof (e.g. at least some steps of any one embodiment of the disclosed method), when executed on processor 200), and interfaces with a main memory 202. Program memory 201 may also contain an operating system for processor 200 and further data like geofence related data of one or more geofences to be applied to a mobile device. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. The program memory (e.g. program memory 201) may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a communication interface 203 which may be configured for wired or wireless communication with a network to enable communication e.g. along network paths 101, 102, 103, 104 of FIG. 1. Communication interface 203 may in particular be configured for communication via wired connection. As disclosed above, a wired connection may correspond to a communication path or link in a wired communication network employing wire-based communication technology and may correspond to a telephone network connection, a cable television connection, an internet connection, a fiber-optic connection or an electromagnetic waveguide connection. The first apparatus 2 may for example use wireless communication interface 203 to receive indications of one or more geofences to be applied to mobile device 3 of FIG. 1 (e.g. corresponding geofence definition data) via network paths 101, 102. The first apparatus 2 may for example further use wireless communication interface 203 to receive information indicative of a capacity for storing geofence related data at the mobile device 3 via network path 103. The first apparatus 2 may for example further use wireless communication interface 203 to obtain information indicative of a size of geofence map data relating to the one or more geofence(s) (e.g. geofences indicated by service 21 or via UI 23 via network paths 101, 102) from the second apparatus 4 and/or the positioning cloud 7 via network path 104.

The components 201 to 203 of the first apparatus 2 may for instance be connected with processor 200 by means of one or more serial and/or parallel busses.

It is to be understood that first apparatus 2 may comprise various other components like a user interface for receiving user input.

Figure 3:
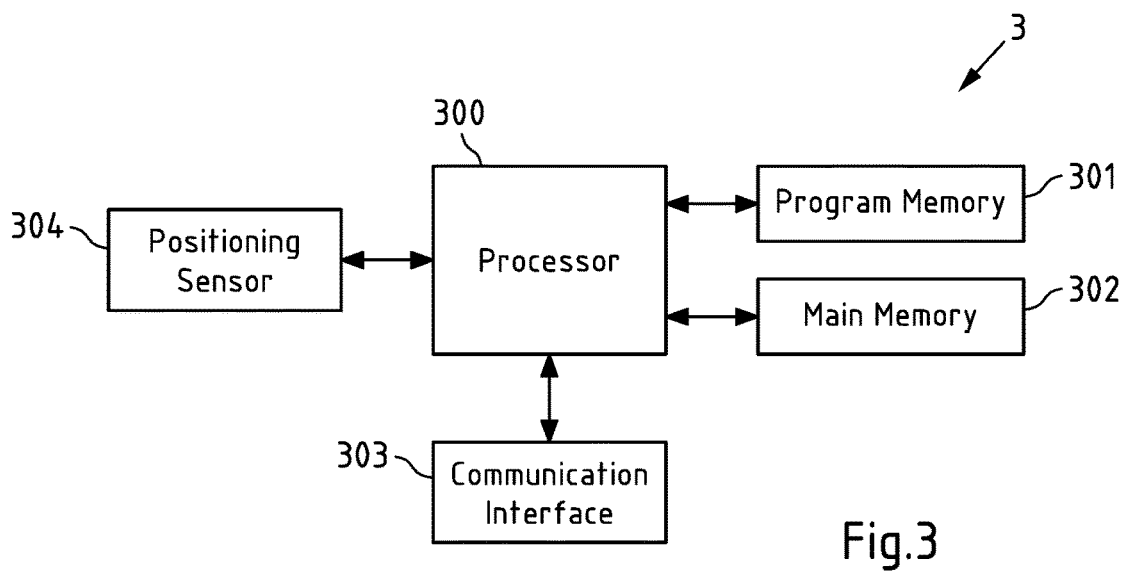
FIG. 3 is a block diagram of an exemplary embodiment of a mobile device according to the invention.

FIG. 3 is a block diagram of an exemplary embodiment of mobile device 3 according to the invention. In the following, it is assumed that mobile device 3 of FIG. 1 corresponds to mobile device 3 of FIG. 3.

Mobile device 3 comprises a processor 300. Processor 300 may represent a single processor or two or more processors, which are for instance at least partially coupled, for instance via a bus. Processor 300 executes a computer program code stored in program memory 301 (e.g. computer program code causing mobile device 3 to perform any one embodiment of the disclosed method(s) (e.g. the steps of any one embodiment of the method disclosed in relation to the first and the second aspect of the present invention) or a part thereof (e.g. at least some steps of any one embodiment of the method disclosed in relation to the first and the second aspect of the present invention), when executed on processor 300), and interfaces with a main memory 302. Program memory 301 may also contain an operating system for processor 300 and further data such as data indicative of a capacity for storing geofence related data at mobile device 3. Some or all of memories 301 and 302 may also be included into processor 300. One of or both of memories 301 and 302 may be fixedly connected to processor 300 or at least partially removable from processor 300, for example in the form of a memory card or stick.

A program memory (e.g. program memory 301) may for example be a non-volatile memory. The program memory (e.g. program memory 301) may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 302) may for example be a volatile memory. It may for example be a DRAM memory, to give non-limiting example. It may for instance be used as a working memory for a processor (e.g. processor 300) when executing an operating system and/or programs.

Processor 300 further controls a communication interface 303, which may in particular be a wireless communication interface, and may be configured for communicating via a cellular network (e.g. to transmit and receive cellular radio signals). For example, wireless communication interface 303 may be or may comprise a 2G/3G/4G/5G radio transceiver. Communication interface 303 may further be configured for communicating via WLAN or Bluetooth. Mobile device 3 may use communication interface 303 to provide (e.g. transmit via network path 103 of FIG. 1) information indicative of a capacity for storing geofence related data at the mobile device 3 to the first apparatus 2 and/or to tracking cloud 6 (the at least one apparatus). Mobile device 3 may further use communication interface 303 to receive geofence related data (geofence definition data and/or geofence map data) from the first apparatus 2 and/or the tracking cloud 6 and/or from the second apparatus 4 and/or the positioning cloud 7 via network path 103 and/or via network path 105. For example, mobile device 3 may use communication interface 303 to receive geofence definition data from the first apparatus 2 and/or the tracking cloud 6 via network path 103 and may use the communication interface 303 to receive geofence map data from the second apparatus 4 and/or the positioning cloud 7 via network path 105. Alternatively, the mobile device 3 may use communication interface 303 to receive geofence definition data and geofence map data from the first apparatus 2 and/or the tracking cloud 6 via network path 103.

Moreover, processor 300 controls a positioning sensor 304 configured for receiving GNSS signals and/or wireless signals from access points including e.g. base stations of one or more mobile communication systems (e.g. 2G/3G/4G/5G cellular radio signals), WLAN access points, Bluetooth (e.g.

Bluetooth Low Energy, BLE) access points, etc. Based on such received signals, mobile device 3 may be configured to estimate its position. To this end, mobile device 3 may be configured to extract navigation data (e.g. ephemeris data that enable determining an orbital position of a GNSS satellite and/or clock data that may enable determining a deviation of a clock of the GNSS satellite from a GNSS system time) e.g. from GNSS signals received from at least four GNSS satellites and to estimate coordinates of its geographical position based thereon. Mobile device 3 may further be configured to measure signal quality parameters such as signal strength of radio signals received from one or more access points and may relate corresponding measurement results to a radio map to estimate its position. It is to be understood that any computer program code required for receiving and processing received GNSS signals and/or radio signals from access points may be stored in an own memory of positioning sensor 304 and may be executed by an own processor of positioning sensor 304 or it may be stored for example in program memory 301 and executed for example by processor 300.

The components 301 to 304 of mobile device 3 may for instance be connected with processor 300 by means of one or more serial and/or parallel busses.

It is to be understood that mobile device 3 may comprise various other components like a user interface for receiving user input.

Figure 4:
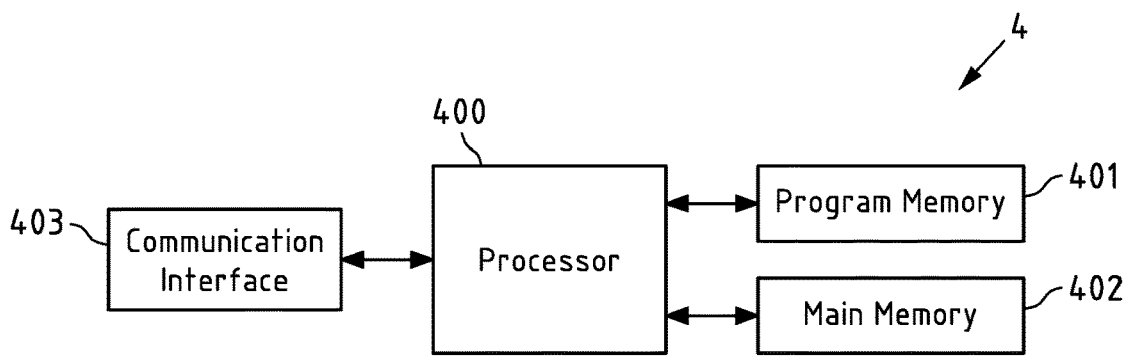
FIG. 4 is a block diagram illustrating an exemplary embodiment of a server (e.g. positioning server) according to the invention.

FIG. 4 is a block diagram of an exemplary embodiment of a second apparatus 4 (an example of the at least one further apparatus) according to the invention, which may correspond to or include for example one or more (further) servers. In the following, it is assumed that second apparatus 4 of FIG. 4 corresponds to the second apparatus of FIG. 1.

Second apparatus 4 comprises a processor 400. Processor 400 may represent a single processor or two or more processors, which are for instance at least partially coupled, for instance via a bus. Processor 400 executes a computer program code stored in program memory 401 (e.g. computer program code causing second apparatus 4 to perform at least corresponding steps relating to any one embodiment of the disclosed method in accordance with the first or second aspect of the present invention when executed on processor 400), and interfaces with a main memory 402. Program memory 401 may also contain an operating system for processor 400 and further data like geofence map data of one or more geofences to be applied to mobile device 3. Some or all of memories 401 and 402 may also be included into processor 400. One of or both of memories 401 and 402 may be fixedly connected to processor 400 or at least partially removable from processor 400, for example in the form of a memory card or stick.

A program memory (e.g. program memory 401) may for example be a non-volatile memory. The program memory (e.g. program memory 401) may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 402) may for example be a volatile memory. It may for example be a DRAM memory, to give non-limiting example. It may for instance be used as a working memory for a processor (e.g. processor 400) when executing an operating system and/or programs.

Processor 400 further controls a communication interface 403 which may be configured for wired or wireless communication with a network to enable communication e.g. along network paths 104, 105 of FIG. 1. Communication interface 403 may in particular be configured for communication via wired connections. As disclosed above, a wired connection may correspond to a communication path or link in a wired communication network employing wire-based communication technology and may correspond to a telephone network connection, a cable television connection, an internet connection, a fiber-optic connection or an electromagnetic waveguide connection. The second apparatus 4 may for example use wireless communication interface 403 to transfer information indicative of a size of geofence map data relating to one or more geofence(s) to the first apparatus 2 and/or to the tracking cloud 6. The second apparatus 4 may further use wireless communication interface 403 to transfer geofence map data relating to one or more geofence(s) to the first apparatus 2 and/or to the tracking cloud 6 via network path 104 and/or to mobile device 3 via network path 105.

The components 401 to 403 of the second apparatus 4 may for instance be connected with processor 400 by means of one or more serial and/or parallel busses.

It is to be understood that second apparatus 4 may comprise various other components like a user interface for receiving user input.

Figure 5A:
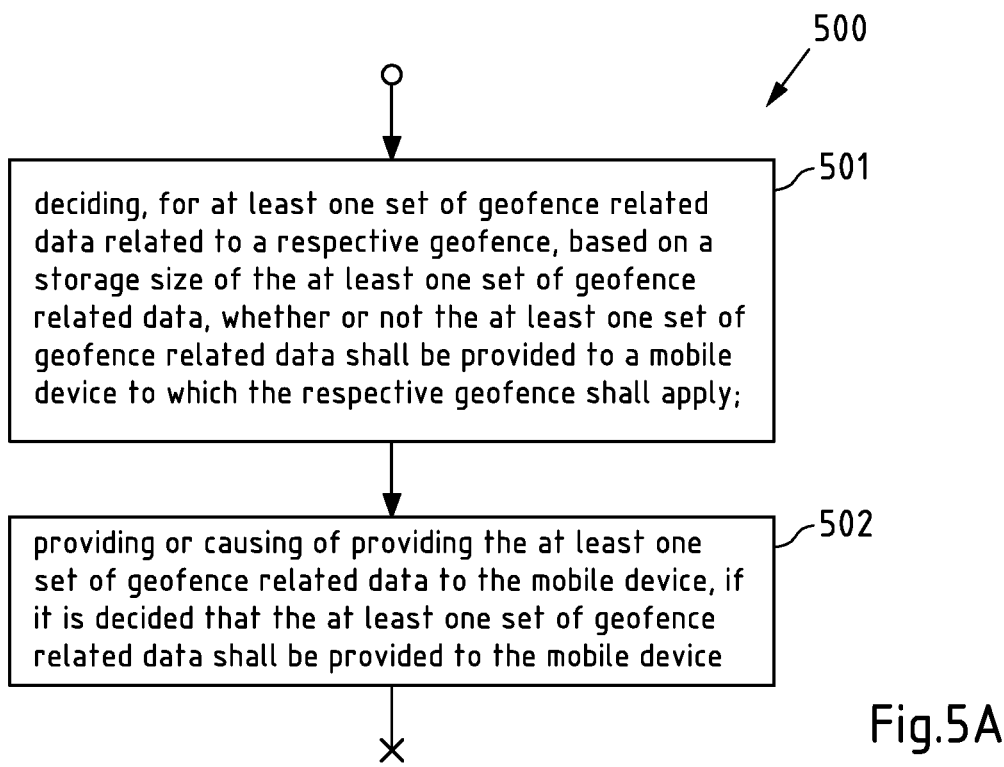
FIG. 5A is a flow chart illustrating an exemplary embodiment of a method according to the first aspect of the invention.

FIG. 5A is a flow chart 500 illustrating an exemplary embodiment of a method according to the first aspect of the invention. Without limiting the scope of the invention, it is assumed in the following that the first apparatus 2 as disclosed above with respect to system 1 of FIG. 1 performs the steps of flow chart 500. It is to be understood that any step of flow chart 500 may be performed by any one or more than one apparatus (e.g. one or more servers) represented by the first apparatus 2 of FIG. 1.

In a step 501, it is decided, for at least one set of geofence related data related to a respective geofence, based on a storage size of the at least one set of geofence related data, whether or not the at least one set of geofence related data shall be provided to a mobile device to which the respective geofence shall apply. As disclosed in more detail above, size of geofence related data, in particular size of corresponding geofence map data and/or corresponding geofence definition data, may provide a criterion for determining whether or not to provide one or more sets of geofence related data of one or more respective geofences to a mobile device to which said one or more geofences shall apply. Information on a storage size in particular of geofence map data, e.g. of map tiles including a boundary defined by a respective one of said one or more geofences, may be obtained e.g. from the second apparatus 4 of FIG. 1. If more than one representation of a geofence is available at said second apparatus 4, information on a storage size of the smallest representation may be obtained. Based on a storage size of such geofence related data (e.g. of the geofence map data and/or of the geofence definition data), the first apparatus 2 may determine geofence data of which geofences is to be stored at the mobile device 3 to be evaluated at the side of the mobile device 3.

In a step 502, the at least one set of geofence related data to the mobile device, if it is decided that the at least one set of geofence related data shall be provided to the mobile device is provided to the mobile device (e.g. via network path 103 and/or via network path 105), e.g. to be evaluated as offline geofence data.

Figure 5B:
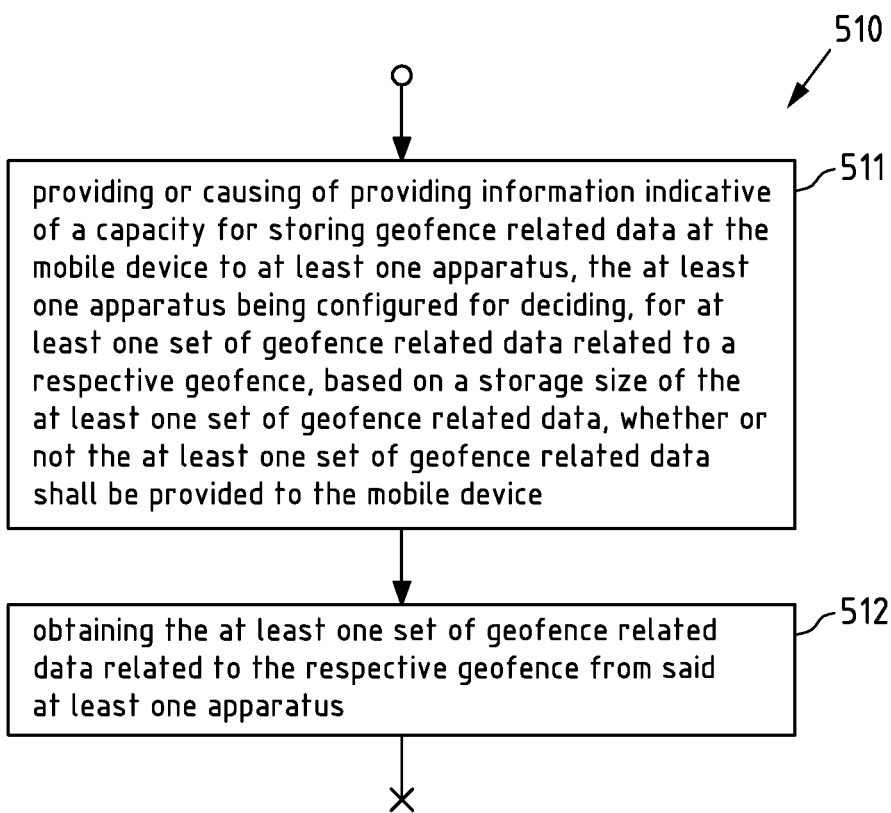
FIG. 5B is a flow chart illustrating an exemplary embodiment of a method according to the second aspect of the invention.

FIG. 5B is a flow chart 510 illustrating an exemplary embodiment of a method according to the second aspect of the invention. Without limiting the scope of the invention, it is assumed in the following that the mobile device 3 as disclosed above with respect to system 1 of FIG. 1 performs the steps of flow chart 510.

In a step 511, mobile device 3 provides information indicative of a capacity for storing geofence related data at the mobile device to at least one apparatus, the at least one apparatus being configured for deciding, for at least one set of geofence related data related to a respective geofence, based on a storage size of the at least one set of geofence related data, whether or not the at least one set of geofence related data shall be provided to the mobile device. As disclosed in more detail above, said at least one apparatus corresponds for example to the first apparatus 2 of FIG. 1.

When providing the information indicative of its capacity for storing geofence related data to said at least one apparatus, mobile device 3 may specifically address said information (e.g. data representing said information) and may format said information (e.g. data representing said information) in a way for the at least one apparatus to be processed.

In a step 512, the mobile device 3 obtains the at least one set of geofence related data related to the respective geofence from said at least one apparatus.

As disclosed above, obtaining the at least one set of geofence related data from said at least one apparatus may enable the mobile device to store said set of geofence related data e.g. at a corresponding memory such as program memory 301 and/or main memory 302 of mobile device 3. Based thereon, mobile device 3 is enabled to evaluate one or more respective geofence(s) respectively related to the obtained data, i.e. is enabled to monitor (e.g. periodically or repeatedly or continuously estimate) its position in relation to said one or more respective geofence(s) and to trigger an alert (e.g. a message to a user) when the mobile device determines that it passes a boundary defined by said one or more geofence(s). By offloading evaluation of geofences from the at least one apparatus (e.g. the first apparatus 2 and/or the tracking cloud 6) to mobile device 3, evaluation of at least those geofences stored at the mobile device can be performed with high efficiency and low delay times while reducing network connections to be maintained and thus reducing battery consumption. At the same time, by storing and evaluating geofence related data of remaining geofences at the side of the at least one apparatus (e.g. the first apparatus 2 and/or the tracking cloud 6), existing storage limitations potentially existing at the side of the mobile device 3 may be respected.

Figure 6A:
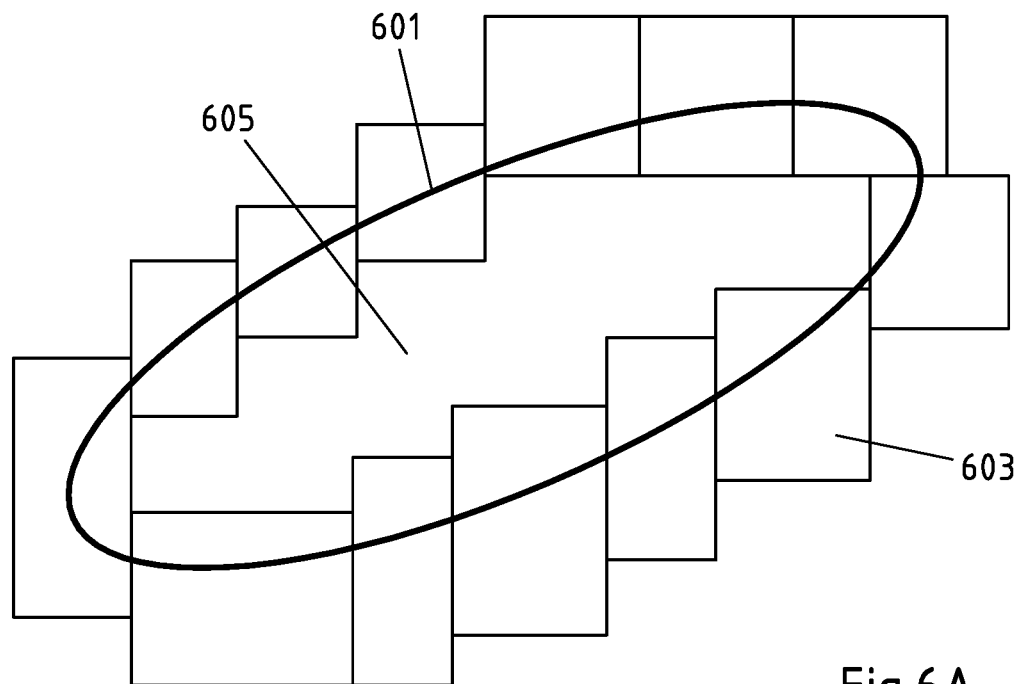
FIG. 6A is a schematic illustration of a geofence and corresponding geofence map data.

FIG. 6A is a schematic illustration of a geofence and corresponding geofence map data. As shown, the illustrated geofence defines a boundary 601, which in the shown case is an essentially elliptical line surrounding a corresponding area of interest. Portions of said boundary 601 are included in respective map tiles 603 (only one labeled for conciseness of the figure). The shown collection of map tiles 603, where each map tile includes at least a portion of the boundary 601 defined by the corresponding geofence is an example of geofence map data. Said map tiles may be tiles of a geographical map e.g. defined in line with the Navigation Data Standard (NDS) and/or may be radio map tiles. Geofence definition data related to the boundary 601 defined by the corresponding geofence may include for example coordinate data representative of boundary 601 (e.g. a collection of respective coordinate points) and/or parameter data representing the form of boundary 601.

Figure 6B:
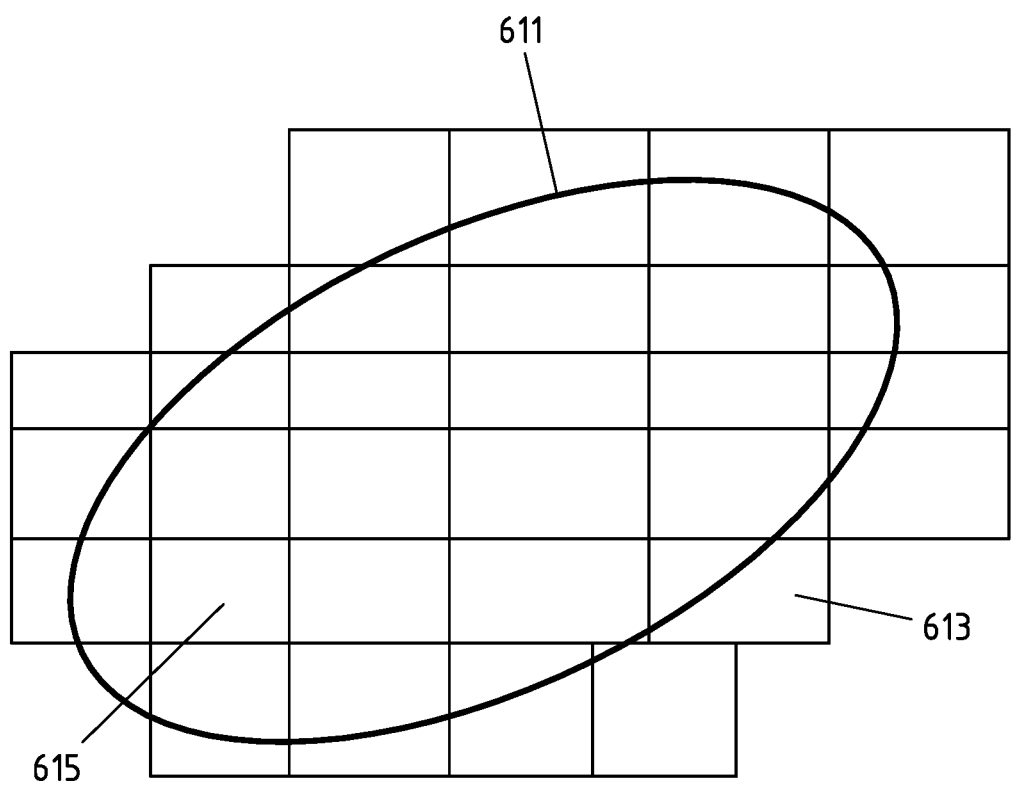
FIG. 6B is a further schematic illustration of a geofence and corresponding geofence map data.

FIG. 6B is a further schematic illustration of a geofence and corresponding geofence map data. As shown, the illustrated geofence defines a boundary 611 surrounding a corresponding area of interest. Portions of said boundary 611 are included in respective map tiles 613 (only one labeled for conciseness of the figure). As compared to the case of FIG. 6A, the geofence map data of FIG. 6B further includes map tiles 615 (only one labeled for conciseness of the figure) without portions of the boundary 611. The shown collection of map tiles 613, 615 with map tiles including at least a portion of the boundary 611 defined by the corresponding geofence and with map tiles within an inner area defined by said boundary not including any portion of said boundary is a further example of geofence map data. As in case of FIG. 6A, said map tiles may be tiles of a geographical map e.g. defined in line with the Navigation Data Standard (NDS) and/or may be radio map tiles. Geofence definition data related to the boundary 611 defined by the corresponding geofence may include for example coordinate data representative of boundary 611 (e.g. a collection of respective coordinate points) and/or parameter data representing the form of boundary 611.

Figure 7A:
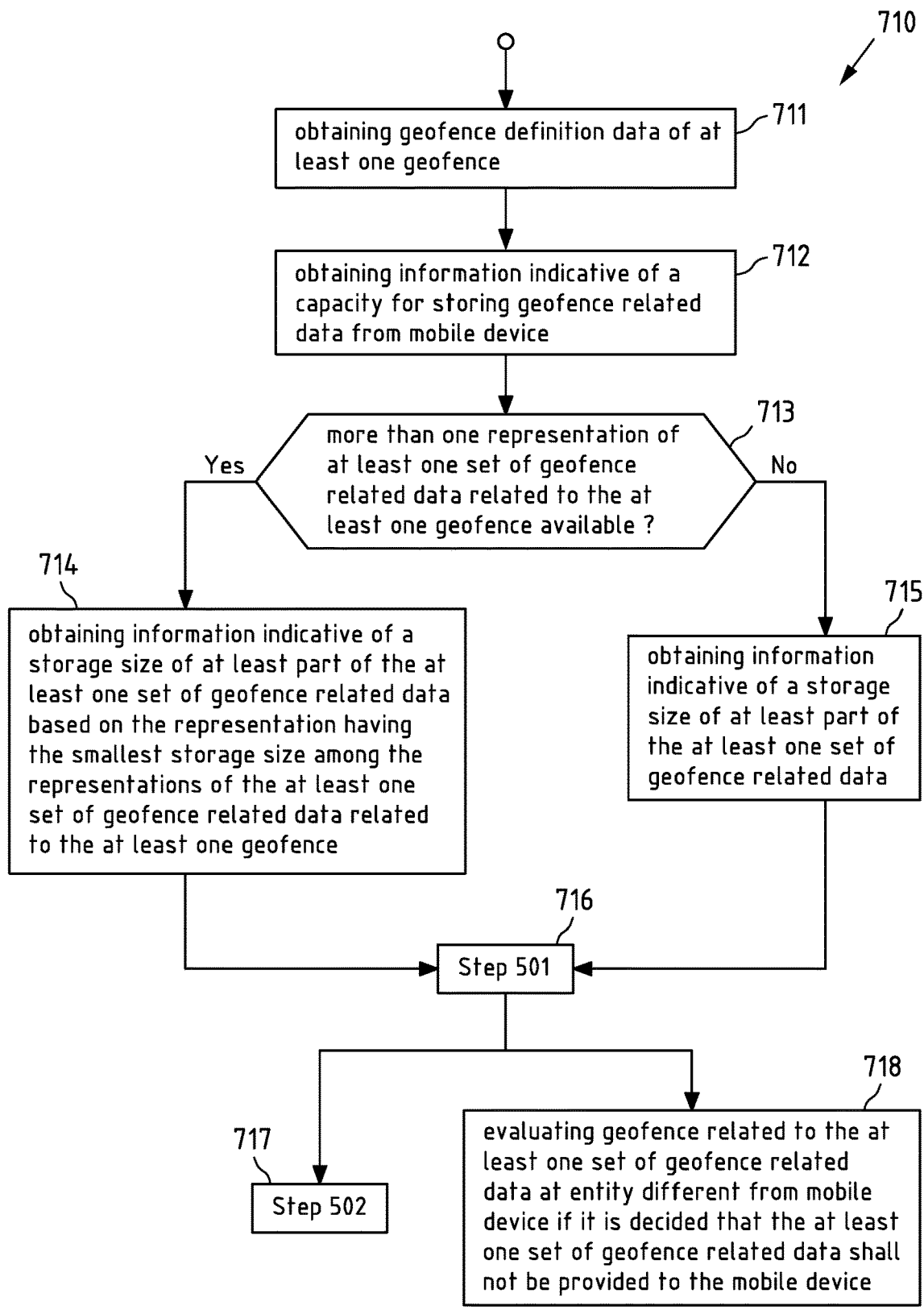
FIG. 7A is a flow chart illustrating a further exemplary embodiment of a method according to the first aspect of the invention.

FIG. 7A is a flow chart illustrating an exemplary method 710 in accordance with the first aspect of the present invention. In step 711, geofence definition data is obtained. As disclosed above, geofence definition data may correspond to data adapted to define one or more geofences in relation to map data such as coordinate data representative of corners of a geofence boundary and/or coordinate data representing a collection of coordinate points defining a geofence boundary. In other words, geofence definition data may include data representative of the geographical dimensions of a corresponding geofence. The geofence definition data may for example be obtained by the first apparatus 2 and/or the tracking cloud 6 of FIG. 1 from API 16 and/or from UI 23 via network path 101 and/or network path 102, respectively.

In step 712 information indicative of a capacity for storing geofence related data is obtained from a mobile device, e.g. at the first apparatus 2 and/or the tracking cloud 6 from mobile device 3 via network path 103. Said information may be obtained e.g. in response to a corresponding request sent from the first apparatus 2 and/or the tracking cloud 6 to mobile device 3 via network path 103. As disclosed above, said capacity for storing geofence related data at the mobile device may correspond to a current capacity of the mobile device for storing such data. In other words, said capacity may correspond to a capacity of a corresponding memory of the mobile device for storing geofence related data, said memory potentially already including stored geofence related data. In the latter case, said capacity may correspond to a remaining capacity of said memory for storing geofence related data.

Step 713 determines if more than one representation of at least one set of geofence related data is available, e.g. at the second apparatus 4 and/or the positioning cloud 7 shown in FIG. 1. For example, the second apparatus 4 and/or the positioning cloud 7 may be configured to perform step 713 if the first apparatus 2 and/or the tracking cloud 6 requests transmission of information indicative of said capacity and may in case more than one representation is available transmit the information as information indicative of a storage size of at least part of the at least one set of geofence related data based on the representation having the smallest storage size among the available representations of the at least one set of geofence related data to the first apparatus 2 and/or the tracking cloud 6 (to be thus obtained by the first apparatus 2 and/or the tracking cloud 6) in step 714. If only one representation is available, information indicative of the corresponding storage size may be transmitted to the first apparatus 2 and/or the tracking cloud 6 (and thus obtained by the first apparatus 2 and/or the tracking cloud 6) at step 715.

Step 716 corresponds to the above disclosed step 501. In other words, in step 716, it is decided, for at least one set of geofence related data related to a respective geofence, based on the information indicative of the storage size obtained either in step 714 or in step 715, whether or not the at least one set of geofence related data shall be provided to mobile device 3 or not. Step 717 corresponds to the above disclosed step 502. In other words, in step 717, the at least one set of geofence related data is provided to mobile device 3, if it is decided in step 716 that the at least one set of geofence related data shall be provided to the mobile device (e.g. via network path 103 and/or via network path 105 of FIG. 1), e.g. to be evaluated as offline geofence data.

If it is decided that the at least one set of geofence related data shall not be provided to the mobile device, the corresponding geofence related to the at least one set of geofence related data is evaluated at an entity different from mobile device, e.g. at the first apparatus 2 and/or the tracking cloud 6 (the at least one apparatus) in step 718. In other words, geofence related data is provided to mobile device 3 in particular to be stored and evaluated at/by the mobile device as long as possible with respect to a capacity of the mobile device for storing geofence related data. On the one hand, mobile device 3 is thus enabled to evaluate geofences relating to geofence related data stored at the mobile device offline, i.e. is enabled to assess if the device is within corresponding geofence boundaries and e.g. to trigger a related event if the mobile device 3 determines that it passes such boundary. On the other hand, geofence related data which is determined not to be stored at the mobile device, in particular since storing said data would exceed the capacity of the mobile device 3 for storing geofence related data, may be stored at an entity different from the mobile device, e.g. at the first apparatus 2 and/or the tracking cloud 6 (the at least one apparatus). Geofences relating to such geofence related data stored at the first apparatus 2 and/or the tracking cloud 6 may be evaluated as offline data, i.e. the first apparatus 2 and/or the tracking cloud 6 may be configured to assess if mobile device 3 is within corresponding boundaries of related geofences based on geofence related data stored at the first apparatus 2 and/or the tracking cloud 6 and based on a monitored position of mobile device 3, e.g. monitored at the at first apparatus 2 and/or the tracking cloud 6 based on position estimates or signal measurement results provided by mobile device 3.

It is to be noted that the order of steps of method 710 as shown in FIG. 7A may be adjusted in accordance with required circumstances and should not be understood as limiting the present invention. For example, step 712 may be performed before step 711 or after any one of steps 713, 714 and 715.

Figure 7B:
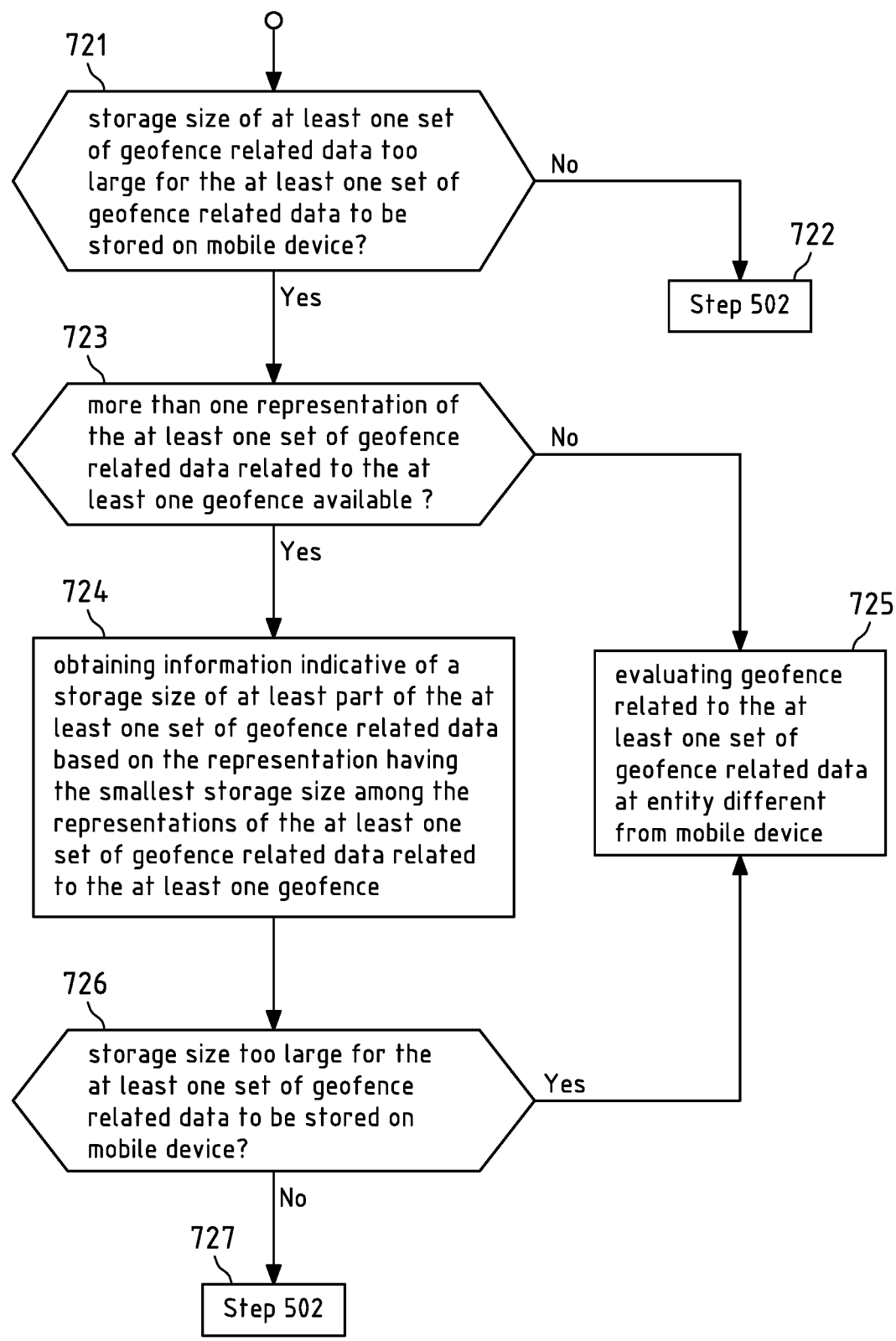
FIG. 7B is a flow chart illustrating a further exemplary embodiment of a method according to the first aspect of the invention.

FIG. 7B is a flow chart illustrating an exemplary method 720 in accordance with the first aspect of the present invention. In a step 721, it is decided, e.g. by the first apparatus 2 and/or the tracking cloud 6, for at least one set of geofence related data related to a respective geofence, if a storage size of the at least one set of geofence related data is too large for the at least one set of geofence related data to be stored at mobile device 3. Step 721 may for example be performed as part of step 501 of FIG. 5A.

As shown, if the at least one set of geofence related data is found to fit into a memory of mobile device 3 for storing geofence related data (i.e. if it does not exceed a current or remaining capacity (examples of a storage size threshold in accordance with all aspects of the present invention) of mobile device 3 for storing geofence related data), method 720 proceeds to step 722, i.e. the at least one set of geofence related data is provided to the mobile device e.g. as in case of step 502 in FIG. 5A. If contrarily, the storage size of the at least one set of geofence related data is found to be too large for the geofence related data to be stored at said memory of mobile device 3, for example the first apparatus 2 and/or the tracking cloud 6 enquires for example at the second apparatus 4 and/or the positioning cloud 7 (e.g. by sending a corresponding request message via network path 104) if more than one representation of the at least one set of geofence related data related to at least one geofence is available (e.g. in a corresponding storage of the second apparatus 4 and/or the positioning cloud 7).

In step 723, for example the second apparatus 4 and/or the positioning cloud 7 decides if more than one representation is available. In the affirmative case ("Yes" in step 723), the method proceeds to step 724 and information indicative of a storage size of the at least one set of geofence related data is obtained based on a representation having at least a smaller storage size as compared to a storage size of the geofence related data assessed in step 721. In the shown case of FIG. 7B, for example the first apparatus 2 and/or the tracking cloud 6 obtains from the second apparatus 4 and/or the positioning cloud 7 information indicative of a storage size of the at least one set of geofence related data based on the representation having the smallest storage size. Based thereon, for example the first apparatus 2 and/or the tracking cloud 6 decides in step 726 whether or not a storage size corresponding to the information obtained in step 724 is (still) too large for the corresponding geofence related data to be stored at mobile device 3.

If the storage size is found to be not too large ("No" in step 726), the method proceeds to step 727, i.e. the at least one set of geofence related data is provided to the mobile device e.g. as in case of step 502 in FIG. 5A. If contrarily, the set of geofence related data of smallest storage size is found to be (still) too large to be stored at said memory of mobile device 3 for storing geofence related data, the method proceeds to step 725. The method similarly proceeds to step 725 if in step 721 a storage size of at least one set of geofence related data has been found to be too large to be stored and if in step 723 it has been found that only one representation is available. In step 725, corresponding geofence related data is evaluated by an entity different from mobile device 3, e.g. by the first apparatus 2 and/or the tracking cloud 6. In other words, a position of mobile device 3 is monitored e.g. by the first apparatus 2 and/or the tracking cloud 6 relative to a geofence related to the geofence related data found to be of too large storage size to be stored at mobile device 3 to assess if mobile device 3 is within corresponding geofence boundaries.

Figure 7C:
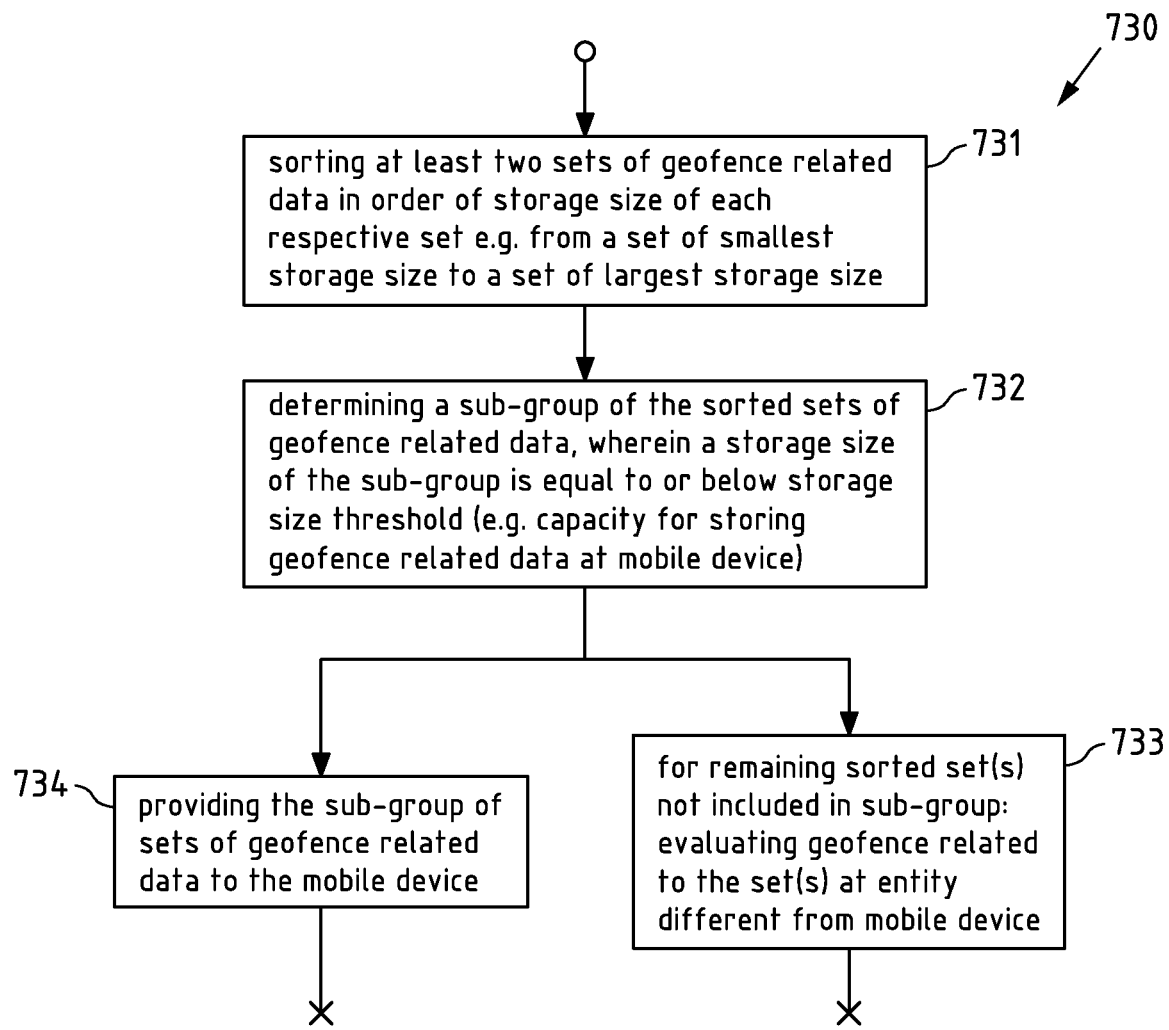
FIG. 7C is a flow chart illustrating a further exemplary embodiment of a method according to the first aspect of the invention.

FIG. 7C is a flow chart illustrating an exemplary method 730 in accordance with the first aspect of the present invention. Thereby, steps 731 and 732 of method 730 correspond to an exemplary embodiment of step 501 of FIG. 5A. Thus, based e.g. on obtained information indicative of respective storage sizes of at least two sets of geofence related data (e.g. obtained in step 714 or in step 715 of FIG. 7A), the at least two sets of geofence related data are sorted (or ordered, arranged, organized, put in order) in order of storage size of each respective set. For example, the sets of geofence related data may be sorted starting from a set of smallest storage size to a set of largest storage size among the at least two sets of geofence related data.

In step 732, a sub-group of the sorted sets of geofence related data is determined such that a storage size of the sub-group (e.g. a total storage size of the sub-group, for example a sum of respective storage sizes of individual sets included in the sub-group) is equal to or below the above disclosed storage size threshold, e.g. the capacity for storing geofence related data at the mobile device. For example, said sub-group may be determined incrementally, e.g. for the set of smallest size and subsequent sets, it may be determined one by one if a size of a corresponding sub-group (e.g. of the first set, of the first and the second set, of the first, the second and the third set, and so on) is equal to or exceeds the storage size threshold. As disclosed above, determining said sub-group of the sorted sets of geofence related data including a sorted sequence of sets starting from the set of smallest storage size may be understood to mean incrementally determining a sub-group of the sorted sets of geofence related data including a sorted sequence of sets starting from the set of smallest storage size by deciding for each set included in the sub-group whether or not providing said sub-group of sets to the mobile device exceeds the storage size threshold (e.g. the capacity for storing geofence related data at the mobile device).

A sub-group determined in step 732 is provided to mobile device 3 in step 734. Remaining sets of sets of geofence related data sorted in step 731 are evaluated at an entity different from mobile device 3, e.g. by the first apparatus 2 and/or the tracking cloud 6 in step 733.

Figure 8:
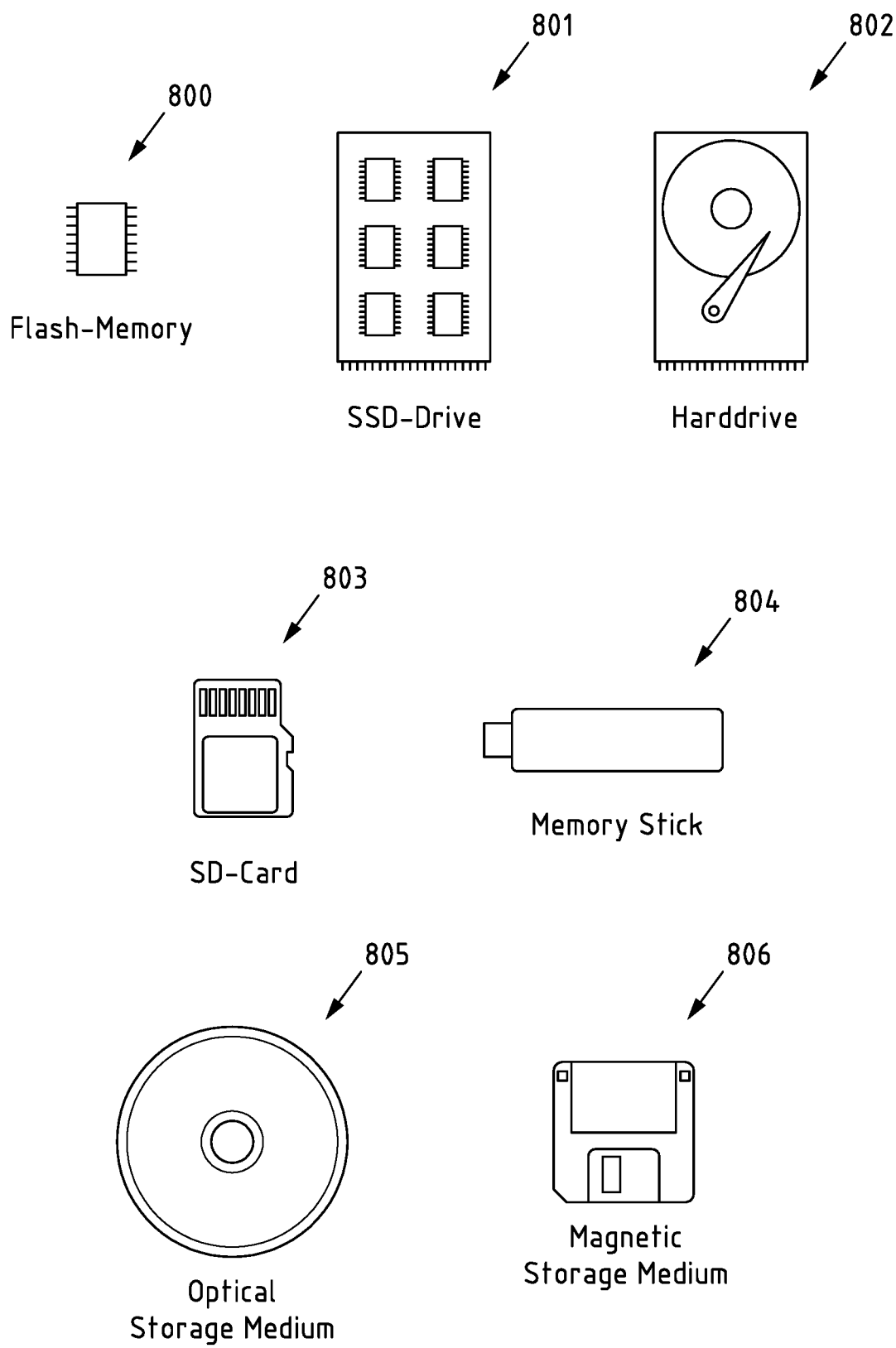
FIG. 8 is a schematic illustration of examples of tangible and non-transitory storage media according to the invention.

FIG. 8 is a schematic illustration of examples of tangible and non-transitory computer-readable storage media according to the present invention that may for instance be used to implement memory 201 of FIG. 2, memory 301 of FIG. 3 and memory 401 of FIG. 4. To this end, FIG. 8 displays a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

The following example embodiments of the invention are also disclosed:

Embodiment 1

A method performed by at least one apparatus, said method comprising:
deciding, for at least one set of geofence related data related to a respective geofence, based at least in part on a storage size of the at least one set of geofence related data, whether or not the at least one set of geofence related data shall be provided to a mobile device to which the respective geofence shall apply; and
providing or causing of providing the at least one set of geofence related data to the mobile device, if it is decided that the at least one set of geofence related data shall be provided to the mobile device, in particular to be stored at the mobile device.

Embodiment 2

The method according to embodiment 1, further comprising:
if it is decided that the at least one set of geofence related data shall not be provided to the mobile device, in particular by an entity different from the mobile device such as the at least one apparatus, assessing or causing of assessing if the mobile device is within a boundary defined by the respective geofence, and/or, when it is determined that the mobile device passes a boundary defined by the respective geofence,
causing an alert, in particular a sound and/or a visible notification to a user of the mobile device, and/or initiating a communication between the mobile device and the at least one apparatus (in particular the tracking cloud) and/or the at least one further apparatus (in particular the positioning cloud) and/or at least one further mobile device.

Embodiment 3

The method according to any of embodiments 1 or 2, further comprising:
obtaining information indicative of a storage size of at least part of the at least one set of geofence related data, in particular from at least one server via a network connection.

Embodiment 4

The method according to embodiment 3, wherein:
if more than one representation of the at least one set of geofence related data related to the respective geofence is available, in particular if the at least one server holds available more than one representation of the at least one set of geofence related data related to the respective geofence, obtaining the information based on the representation having the smallest storage size among the representations of the at least one set of geofence related data related to the respective geofence, in particular among the representations of the at least one set of geofence related data related to the respective geofence held available at the at least one server.

Embodiment 5

The method according to embodiment 3, wherein:
if the storage size of the at least one set of geofence related data is considered too large for the at least one set of geofence related data to be stored on the mobile device, and if more than one representation of the at least one set of geofence related data related to the respective geofence is available, obtaining the information based on a representation having a smaller storage size among the representations of the at least one set of geofence related data related to the respective geofence.

Embodiment 6

The method according to any of the preceding embodiments, wherein the deciding whether or not the at least one set of geofence related data shall be provided to the mobile device is further based on a (e.g. current) capacity for storing geofence related data at the mobile device.

Embodiment 7

The method according to any of the preceding embodiments, wherein the deciding whether or not the at least one set of geofence related data shall be provided to the mobile device comprises:
comparing a storage size of at least two sets of geofence related data (e.g. a sum of respective storage sizes of the respective sets of geofence related data; e.g. each of the two sets of geofence related data respectively related to a respective geofence) to a storage size threshold; and deciding that the at least two sets of geofence related data shall be provided to the mobile device if the storage size of the at least two sets of geofence related data is below or equal to the storage size threshold, and/or deciding that the at least two sets of geofence related data shall not be provided to the mobile device if the storage size of the at least two sets of geofence related data is larger than the storage size threshold, and/or deciding that at least one of the at least two sets of geofence related data shall be not used in relation to the mobile device and/or shall be discarded if the storage size of the at least two sets of geofence related data is larger than the storage size threshold.

Embodiment 8

The method according to embodiment 7, wherein comparing the storage size to the storage size threshold comprises:

sorting (ordering, arranging, organizing, putting in order) the at least two sets of geofence related data in order of storage size of each respective set e.g. from a set of smallest storage size to a set of largest storage size.

Embodiment 9

The method according to embodiment 8, further comprising: determining a sub-group of the sorted sets of geofence related data including a sorted sequence of sets e.g. starting from the set of smallest storage size, wherein a storage size of the sub-group is equal to or below the storage size threshold; and providing or causing of providing the sub-group of sets of geofence related data to the mobile device.

Embodiment 10

The method according to embodiment 9, further comprising:

for at least one of the at least two sets of geofence related data not included in the determined sub-group, assessing or causing of assessing if the mobile device is within a boundary defined by the respective geofence related to the at least one of the at least two sets of geofence related data not included in the determined sub-group.

Embodiment 11

The method according to any of embodiments 7 to 10, wherein the storage size threshold corresponds to the capacity for storing geofence related data at the mobile device.

Embodiment 12

The method according to any of the preceding embodiments, wherein the deciding whether or not the at least one set of geofence related data shall be provided to the mobile device is further based on a positioning history of the mobile device.

Embodiment 13

The method according to any of the preceding embodiments, wherein the at least one set of geofence related data comprises at least geofence definition data and geofence map data, the geofence definition data and the geofence map data respectively being related to the respective geofence.

Embodiment 14

The method according to embodiment 13, further comprising:

obtaining the geofence definition data from a user interface and/or via an application programming interface, in particular via a network connection.

Embodiment 15

The method according to any of embodiments 13 or 14, wherein the obtaining the information indicative of a storage size of at least part of the at least one set of geofence related data from at least one server via a network connection comprises:

obtaining information indicative of a storage size at least of geofence map data related to said respective geofence from the at least one server.

Embodiment 16

The method according to any of embodiments 13 to 15, further comprising:

estimating a position of the mobile device relative to the respective geofence based at least in part on the geofence map data related to said respective geofence.

Embodiment 17

The method according any of the preceding embodiments, further comprising:

determining if the mobile device has passed a boundary of a geographical area defined by said respective geofence;

if it is determined that the mobile device has passed a boundary of the geographical area:

causing an event (e.g. an alert), in particular at the mobile device.

Embodiment 18

The method according to any of embodiments 6 to 17, further comprising: obtaining information indicative of the capacity for storing geofence related data from the mobile device.

Embodiment 19

The method according to embodiment 18, further comprising: requesting or causing of requesting transmission of said information indicative of the capacity for storing geofence related data.

Embodiment 20

A method performed at a mobile device, said method comprising:

providing or causing of providing information indicative of a capacity for storing geofence related data at the mobile device to at least one apparatus, the at least one apparatus being configured for deciding, for at least one set of geofence related data related to a respective geofence, based at least in part on a storage size of the at least one set of geofence related data, whether or not the at least one set of geofence related data shall be provided to the mobile device;

obtaining the at least one set of geofence related data related to the respective geofence from said at least one apparatus.

Embodiment 21

The method according to embodiment 20, wherein the at least one set of geofence related data comprises at least geofence definition data and geofence map data, the geofence definition data and the geofence map data respectively being related to the respective geofence, the method further comprising:

obtaining, at least in part, the geofence map data and/or the geofence definition data from the at least one apparatus via a network connection.

Embodiment 22

The method according to embodiment 20, wherein the at least one set of geofence related data comprises at least geofence definition data and geofence map data, the geofence definition data and the geofence map data respectively being related to the respective geofence, the method further comprising:

obtaining, at least in part, the geofence map data and/or the geofence definition data from at least one positioning server via a network connection.

Embodiment 23

The method according to any of embodiments 20 to 22, further comprising:

estimating or monitoring a position of the mobile device relative to the respective geofence based at least in part on the obtained geofence related data.

Embodiment 24

The method according to any of embodiments 20 to 23, further comprising:

determining if the mobile device has passed a boundary of a geographical area defined by the respective geofence;

when it is determined that the mobile device has passed a boundary of the geographical area:

causing an alert, in particular a sound and/or a visible notification to a user of the mobile device, and/or initiating a communication between the mobile device and the at least one apparatus (in particular the tracking cloud) and/or the at least one further apparatus (in particular the positioning cloud) and/or at least one further mobile device.

Embodiment 25

The method according to any of embodiments 20 to 24, further comprising:

receiving or causing of receiving a request for providing information indicative of the capacity for storing geofence related data at the mobile device to at least one apparatus.

Embodiment 26

An apparatus configured to perform and/or control the method according to any of embodiments 1 to 25 or comprising respective means for performing and/or controlling the steps of the method according to any of embodiments 1 to 25.

Embodiment 27

An apparatus comprising at least one processor and at least one memory that contains program code, wherein the memory and the program code are configured to use the at least one processor to cause an apparatus to perform and/or control at least the method of any of embodiments 1 to 25.

Embodiment 28

System comprising one or more apparatuses that are configured to perform and/or control the method according to any of embodiments 1 to 25 or have means for performing and/or controlling the steps of the method according to any of embodiments 1 to 25.

Embodiment 29

System comprising at least one apparatus configured to perform and/or control the method according to any of embodiments 1 to 19 or comprising respective means for performing and/or controlling the steps of the method according to any of embodiments 1 to 19 and at least one apparatus configured to perform and/or control the method according to any of embodiments 20 to 25 or comprising respective means for performing and/or controlling the steps of the method according to any of embodiments 20 to 25.

Embodiment 30

At least one network server comprising the apparatus configured to perform and/or control the method according to any of embodiments 1 to 19 or comprising respective means for performing and/or controlling the steps of the method according to any of embodiments 1 to 19.

Embodiment 31

A mobile device configured to perform the method according to any of embodiments 20 to 25 or comprising respective means for performing and/or controlling the steps of the method according to any of embodiments 20 to 25.

In accordance with all aspects of the invention and with all embodiments thereof, a network connection may include a wireless or a wired network connection.

Thereby, a wired connection may correspond to a communication path or link in a wired communication network employing wire-based communication technology and may correspond to a telephone network connection, a cable television connection, an internet connection, a fiber-optic connection or an electromagnetic waveguide connection.

Further, a wireless connection may correspond to a communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A wireless connection may further include a Device-to-Device (D2D) communication path (e.g. involving vehicles, mobile devices, Road Side Units (RSU) or IOT devices).

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (1) to a combination of processor(s) or (2) to sections of processor(s)/ software (including digital signal processor(s)), software, and memory(ies) that work together to cause an apparatus, such as a mobile device, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by at least one apparatus, said method comprising:

for at least one set of geofence related data related to a respective geofence, determining whether or not the at least one set of geofence related data shall be provided to a mobile device to which the respective geofence shall apply based at least in part on a storage size of the at least one set of geofence related data, wherein the storage size of the at least one set of geofence related data indicates an amount of memory required for storing the at least one set of geofence related data;

when it is determined that the at least one set of geofence related data shall be provided to the mobile device, providing or causing of providing the at least one set of geofence related data to the mobile device; and when it is determined, based at least in part on the storage size of the at least one set of geofence related data, not to provide the at least one set of geofence related data and more than one representation of the at least one set of geofence related data related to the respective geofence is available, obtaining information indicative of the storage size of at least part of the at least one set of geofence related data based on a representation having a smaller storage size among the representations of the at least one set of geofence related data related to the respective geofence.

2. The method according to claim 1, further comprising:
if it is decided that the at least one set of geofence related data shall not be provided to the mobile device,
assessing or causing assessing if the mobile device is within a boundary defined by the respective geofence.

3. The method according to claim 1, further comprising:
obtaining information indicative of the storage size of at least part of the at least one set of geofence related data.

4. The method according to claim 3, wherein:
if more than one representation of the at least one set of geofence related data related to the respective geofence is available, obtaining the information based on the representation having the smallest storage size among the representations of the at least one set of geofence related data related to the respective geofence.

5. The method according to claim 1, further comprising:
determining whether to provide the representation having the smaller storage size to the mobile device based at least in part on the smaller storage size; and
when it is determined that the representation having the smaller storage size shall be provided to the mobile device, providing or causing of providing the representation having the smaller storage size to the mobile device.

6. The method according to claim 1, wherein the deciding whether or not the at least one set of geofence related data shall be provided to the mobile device comprises:
comparing a storage size of at least two sets of geofence related data to a storage size threshold; and
deciding that the at least two sets of geofence related data shall be provided to the mobile device if the storage size of the at least two sets of geofence related data is below or equal to the storage size threshold.

7. The method according to claim 6, wherein comparing the storage size to the storage size threshold comprises:
sorting the at least two sets of geofence related data in order of storage size of each respective set.

8. The method according to claim 7, further comprising:
determining a sub-group of the sorted sets of geofence related data including a sorted sequence of sets, wherein a storage size of the sub-group is equal to or below the storage size threshold; and providing or causing of providing the sub-group of sets of geofence related data to the mobile device.

9. The method according to claim 8, further comprising:
for at least one of the at least two sets of geofence related data not included in the determined sub-group,
assessing or causing of assessing if the mobile device is within a boundary defined by the at least one of the at least two sets of geofence related data not included in the determined sub-group.

10. The method according to claim 6, wherein the storage size threshold corresponds to a capacity for storing geofence related data at the mobile device.

11. The method according to claim 1, wherein the at least one set of geofence related data comprises at least geofence definition data and geofence map data, the geofence definition data and the geofence map data respectively being related to the respective geofence.

12. The method according to claim 11, further comprising:
obtaining the geofence definition data from a user interface and/or via an application programming interface.

13. The method according to claim 11, wherein the obtaining the information indicative of a storage size of at least part of the at least one set of geofence related data from at least one server via a network connection comprises:
obtaining information indicative of a storage size at least of geofence map data related to said respective geofence from the at least one server.

14. A method performed at a mobile device, said method comprising:
providing or causing of providing information indicative of a capacity for storing geofence related data at the mobile device to at least one apparatus,
the at least one apparatus being configured for determining, for at least one set of geofence related data related to a respective geofence, whether or not the at least one set of geofence related data shall be provided to the mobile device based at least in part on a storage size of the at least one set of geofence related data, wherein the storage size of the at least one set of geofence related data indicates an amount of memory required for storing the at least one set of geofence related data, and
when it is determined, based at least in part on the storage size of the at least one set of geofence related data, not to provide the at least one set of geofence related data and more than one representation of the at least one set of geofence related data related to the respective geofence is available, obtaining information indicative of the storage size of at least part of the at least one set of geofence related data based on a representation having a smaller storage size among the representations of the at least one set of geofence related data related to the respective geofence; and
obtaining the at least one set of geofence related data related to the respective geofence from said at least one apparatus.

15. An apparatus comprising at least one processor and at least one memory that contains program code, wherein the memory and the program code are configured to use the at least one processor to cause the apparatus to:
for at least one set of geofence related data related to a respective geofence, determine whether or not the at least one set of geofence related data shall be provided to a mobile device to which the respective geofence shall apply based at least in part on a storage size of the at least one set of geofence related data, wherein the storage size of the at least one set of geofence related data indicates an amount of memory required for storing the at least one set of geofence related data;
when it is determined that the at least one set of geofence related data shall be provided to the mobile device, provide or cause provision of the at least one set of geofence related data to the mobile device; and
when it is determined, based at least in part on the storage size of the at least one set of geofence related data, not to provide the at least one set of geofence related data and more than one representation of the at least one set of geofence related data related to the respective geofence is available, obtain information indicative of the storage size of at least part of the at least one set of geofence related data based on a representation having a smaller storage size among the representations of the at least one set of geofence related data related to the respective geofence.

16. The apparatus according to claim 15, wherein the memory and the program code are further configured to use the at least one processor to cause the apparatus to:
if it is decided that the at least one set of geofence related data shall not be provided to the mobile device,
assess or cause assessing if the mobile device is within a boundary defined by the respective geofence.

17. The apparatus according to claim 15, wherein the memory and the program code are further configured to use the at least one processor to cause the apparatus to:
obtain information indicative of a storage size of at least part of the at least one set of geofence related data.

18. The apparatus according to claim 17, wherein the memory and the program code are configured to use the at least one processor to cause the apparatus to obtain the information, if more than one representation of the at least one set of geofence related data related to the respective geofence is available, by obtaining the information based on the representation having the smallest storage size among the representations of the at least one set of geofence related data related to the respective geofence.

19. The apparatus according to claim 17, wherein the memory and the program code are configured to use the at least one processor to cause the apparatus to:
determine whether to provide the representation having the smaller storage size to the mobile device based at least in part on the smaller storage size; and
when it is determined that the representation having the smaller storage size shall be provided to the mobile device, provide or cause provision of the representation having the smaller storage size to the mobile device.

20. The apparatus according to claim 15, wherein the memory and the program code are configured to use the at least one processor to cause the apparatus to decide whether or not the at least one set of geofence related data shall be provided to the mobile device by:
comparing a storage size of at least two sets of geofence related data to a storage size threshold; and
deciding that the at least two sets of geofence related data shall be provided to the mobile device if the storage size of the at least two sets of geofence related data is below or equal to the storage size threshold.

* * * * *